United States Patent [19]

Kitahara

[11] Patent Number: 5,176,375
[45] Date of Patent: Jan. 5, 1993

[54] SHEET FEEDING APPARATUS

[75] Inventor: Makoto Kitahara, Tokyo, Japan

[73] Assignee: Canon Kabushiki Kaisha, Tokyo, Japan

[21] Appl. No.: 908,859

[22] Filed: Jul. 1, 1992

Related U.S. Application Data

[63] Continuation of Ser. No. 841,781, Mar. 2, 1992, abandoned, which is a continuation of Ser. No. 591,759, Oct. 2, 1990, abandoned.

[30] Foreign Application Priority Data

Oct. 2, 1988 [JP] Japan .................................. 1-255190
Oct. 19, 1989 [JP] Japan .................................. 1-270424
Dec. 4, 1989 [JP] Japan .................................. 1-313540
May 23, 1990 [JP] Japan .................................. 2-134678

[51] Int. Cl.⁵ .............................................. B65H 5/00
[52] U.S. Cl. ..................................... 271/10; 271/242; 271/272
[58] Field of Search ............... 271/3, 3.1, 4, 6, 7, 271/10, 12, 242, 272; 355/308, 313

[56] References Cited

U.S. PATENT DOCUMENTS 4,708,469 11/1987 Bober et al. ................. 271/3.1 X
4,769,674 9/1988 Kitajima et al. .
4,777,511 10/1988 Takahashi ..................... 271/3.1 X
4,925,176 5/1990 Acquaviva ....................... 271/3.1
4,935,775 6/1990 Ueda et al. .

FOREIGN PATENT DOCUMENTS 92533 4/1988 Japan ...................................... 271/3
98534 4/1989 Japan ...................................... 271/6

Primary Examiner—David H. Bollinger
Attorney, Agent, or Firm—Fitzpatrick, Cella, Harper & Scinto

[57] ABSTRACT

There is described a sheet feeding apparatus having a stacking tray on which sheets are stacked, a first sheet feeding rotary member for supplying a sheet from the stacking tray, and a second sheet feeding rotary member for feeding the sheet from the first sheet feeding rotary member toward a predetermined processing position. The feeding apparatus has a control for rotating the second sheet feeding rotary member for a predetermined time during the feeding of a preceding sheet, for stopping the preceding sheet with a trailing end thereof being retained in a nip of the second sheet feeding rotary member and then for rotating the second sheet feeding rotary member with a leading end of a next sheet being inserted into the nip to feed the preceding and next sheeets simultaneously.

18 Claims, 34 Drawing Sheets

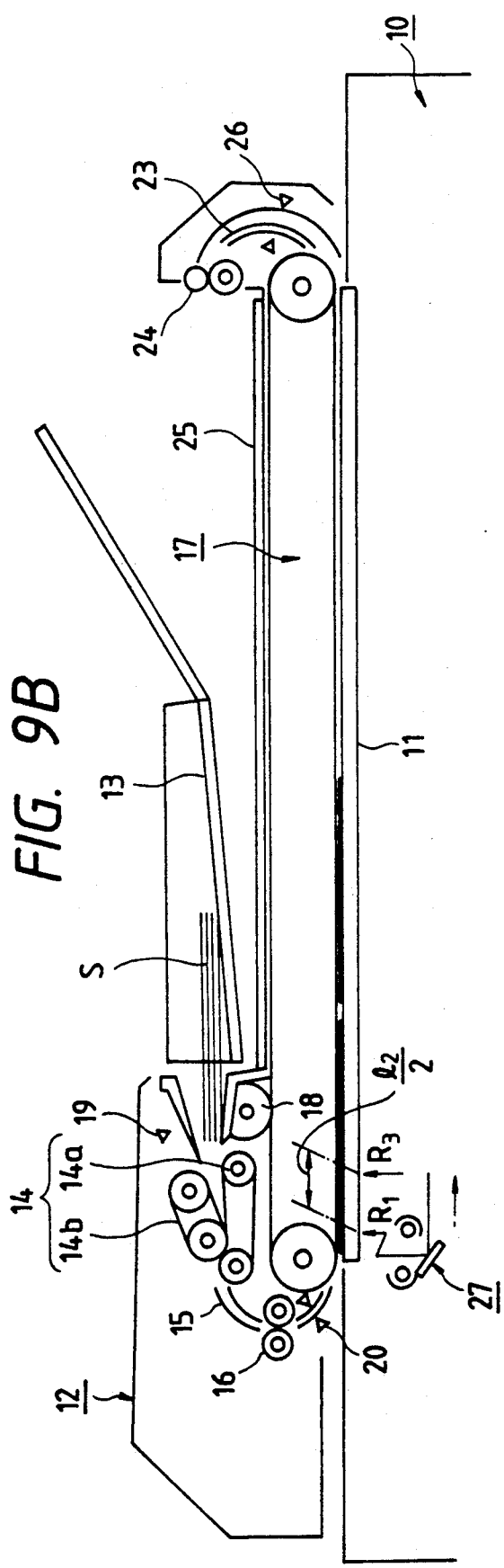
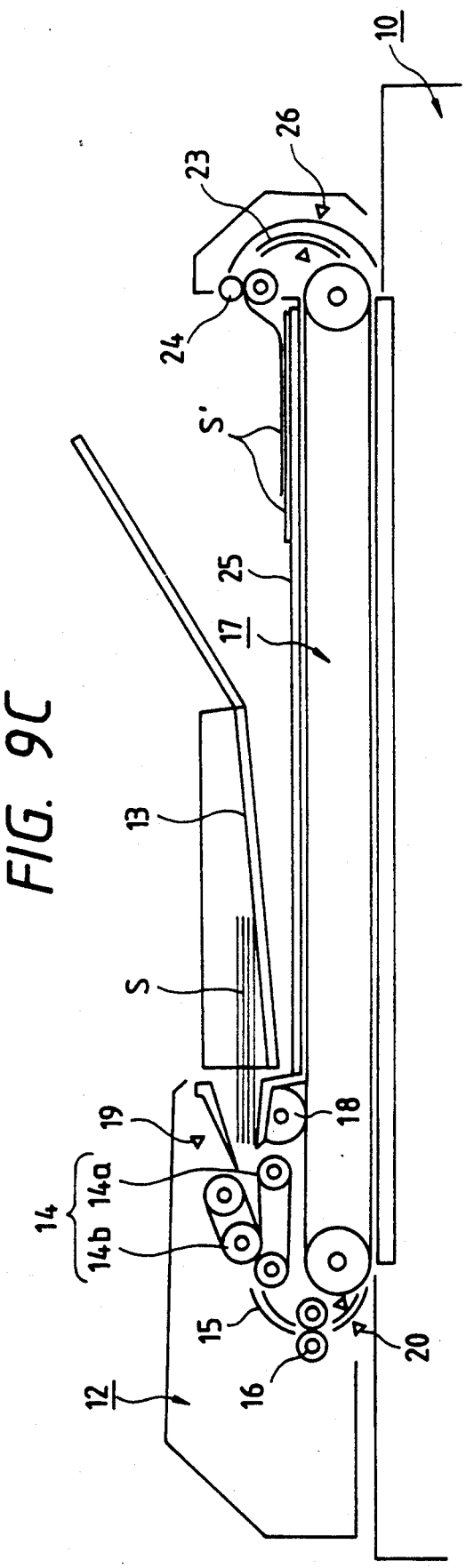

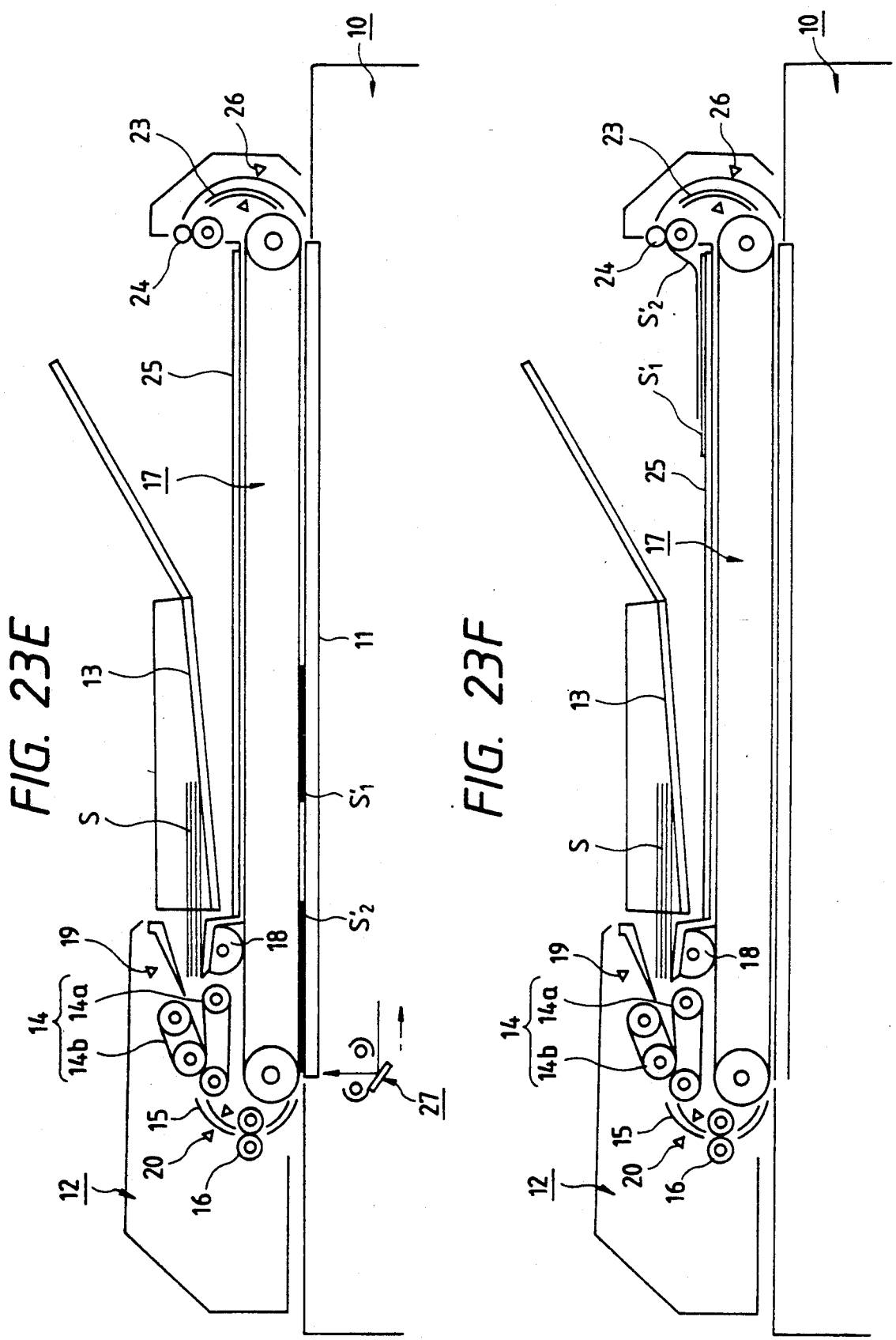

SHEET FEEDING APPARATUS

This application is a continuation of application Ser. No. 07/841,781 filed Mar. 2, 1992, now abandoned; which is a continuation application of Ser. No. 07/591,759, filed Oct. 2, 1990, now abandoned.

BACKGROUND OF THE INVENTION

1. Field of the Invention

The present invention relates to a sheet feeding apparatus, and more particularly, it relates to a sheet feeding apparatus such as an original feeding apparatus used with a copying machine, reader and the like, which can simultaneously rest a plurality of sheets on a predetermined processing device.

2. Related Background Art

In the past, an original feeding apparatus has been known as a typical example of such sheet feeding apparatuses, which will be now described as an example.

In the copying operation effected by an image forming system such as a copying machine and the like incorporating an original feeding apparatus, wherein originals are automatically and continuously fed to a platen, it is known that two images of two originals are printed side by side on one surface of a single recording medium (copying sheet).

FIG. 1A shows an example of the image forming system performing such copying operation.

In FIG. 1, the image forming system comprises a frame or body 100 and a platen 101 acting as an image reading portion. An original feeding apparatus 200 is disposed above the platen. The original feeding apparatus 200 comprises a stacking tray 201 on which a plurality of originals S' are stacked (original stack S), a separating portion 202 for separating the original S' from the original stack S on the stacking tray 201 one by one, feed rollers 203 for feeding the original S' separated by the separating portion 202 toward the platen 101, a sensor 204 disposed between the feed rollers 203 and the separating portion 202 and adapted to detect the original S', a whole-surface belt 205 for setting the original S' fed from the feed rollers 203 on the platen 101, an ejector roller 207 for ejecting the original S' from the platen 101 onto a sheet discharge tray or ejector tray 206.

In the above image forming system, the original stack S is set on the stacking tray with the images thereof turned upside (refer to FIG. 1A). When a copy start signal is applied to the apparatus, the separating portion 202 is rotated to separate a lower-most original S' from the original stack S and to feed it until a leading end of the original abuts against the feed rollers 203 (refer to FIG. 1B). Then, the feed rollers 203 and the whole-surface belt 205 are rotated normally so that the original S' is fed toward the platen 101; the rollers 203 and the belt 205 are stopped when a trailing end of the original S' leaves the feed rollers 203 (refer to FIG. 1C).

Then, the whole-surface belt 205 is rotated slightly reversely until the trailing end of the original S' abuts against the feed rollers 203, and then, the belt is stopped (refer to FIG. 1D). Thereafter, the separating portion 202 is rotated to separate a next or second original S' and to feed it until a leading end of the second original abuts against the feed rollers 203 (refer to FIG. 1E). Then, the feed rollers 203 and the whole-surface belt 205 are again rotated normally so that the second original S' is fed toward the platen 101; the whole-surface belt 205 is stopped when the second original S' reaches a predetermined position on the platen 101 (refer to FIG. 1F).

In this way, two originals S' are arranged side by side on the platen 101. Thereafter, when images of these originals S' are read (refer to FIG. 1G), the images of two originals S' are copied or printed on one surface of a single copying sheet. After the reading of the images has been finished, the whole-surface belt 205 and the ejector roller 207 are rotated normally to eject or discharge the originals S' on the platen 101 onto the discharge tray 206 (refer to FIG. 1H).

However, as apparent from FIG. 2 showing a nip between the feed rollers 203 in an enlarged scale, it is difficult for the leading end of the second original S' to be abutted against the trailing end of the lowermost or first original S', and thus, a clearance corresponding to a width X of the nip will be created between these ends of the two originals. Consequently, a clearance corresponding to the width X is also created between two originals S' rested on the platen 101, which leads in the drawback in the copying operation.

For example, as shown in FIG. 3, assuming that the size of the original S' is $l_1$ and the clearance between two originals is $l_2$, when the images of these originals are copied on a copying sheet having a size twice the original, since the first original S' is shifted by a distance $l_2$ from an image reading area, an image portion included in a hatched area (having a width $l_2$) of the first original S' will disappear from the copied image on the copying sheet.

SUMMARY OF THE INVENTION

The present invention aims to eliminate the above-mentioned conventional drawback, and an object of the present invention is to provide an image forming system and an original feeding apparatus used with such system, which can read images of a plurality of originals arranged side by side and can print the read images on a single recording medium without the lack or disappearance of portion of the images.

In order to achieve the above object, the original feeding apparatus according to the present invention comprises a control means for stopping a preceding or first sheet (original) with a trailing end thereof being retained in a nip between feed rotary members (rollers) and then for rotating a second sheet feed rotary means with a leading end of a next or second sheet being inserted into the nip to feed the first and second sheet simultaneously, thereby minimizing a clearance between the sheets and thus eliminating or minimizing the lack of the image information.

According to the present invention, it is possible to minimize the clearance between the sheets (originals), thereby eliminating or minimizing the lack of the image information.

Further, unlike the conventional technique, since the normal and reverse rotations of a driving mechanism are not required for approaching two originals, the driving mechanism can be simplified and the operating time therefor can be reduced to shorten the whole processing time.

Further, the present invention includes a control means of an original feeding means for controlling an original stopping position with respect to an original reading position, a control means of an image information reading means for controlling the timing of the initiation of the image information reading means with respect to the original position, and a control means of a convey means for controlling the timing of the initiation of the conveyance of a recording medium. Thereby, in printing two images of two originals on the same surface of the single recording medium having a size twice that of the original, by controlling the original stopping position and the timing of the initiation of the image information reading means, the amounts of the lack of the images of first and second originals on the recording medium are equalized, thus minimizing the lack of the image of each original on the recording medium, with the result that the risk of the lack of the image of each original on the recording medium can be reduced.

Further, in the present invention, a trailing end of the previous or first original is previously overlapped with a leading end of the next or second original, and the original feeding amount is so controlled that the overlapped area between the originals is just vanished when the originals reach the original reading position. In this way, for example, when the image information of two originals is to be printed on the same surface of a single recording medium having a size larger than the original by two times, the control means controls the original feeding amount of the original feeding means in such a manner that the two originals are arranged side by side without a clearance therebetween at the original reading position, whereby the image information of the originals can be printed on the recording medium without the disappearance a portion of the printed images from the recording medium.

BRIEF DESCRIPTION OF THE DRAWINGS

FIGS. 9A to 9C are elevational views of an original feeding apparatus used with the image forming system of FIG. 8, for explaining the operation thereof;

FIGS. 23A to 23F are elevational views of the original feeding apparatus of FIG. 22, for explaining the operation thereof;

DESCRIPTION OF THE PREFERRED EMBODIMENTS

Figure 4:
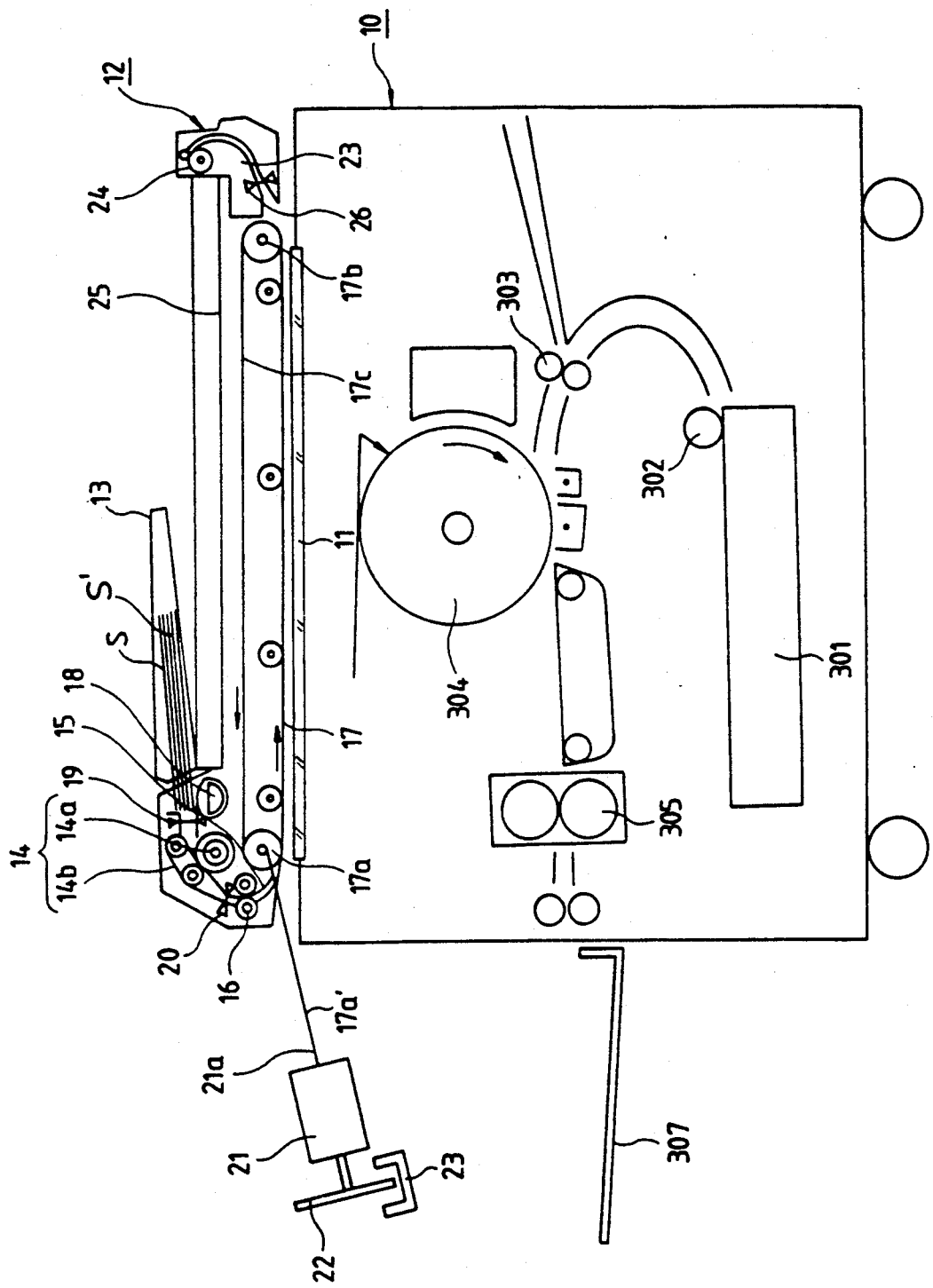
FIG. 4 is an elevational view of an original feeding apparatus and an image forming system, according to a first embodiment of the present invention.

The present invention will now be explained in connection with embodiments thereof with reference to the accompanying drawings FIG. 4 is a schematic sectional view of a copying machine incorporating an original feeding apparatus according to a first embodiment of the present invention, FIGS. 5A to 5F are views for explaining the operation of the original feeding apparatus, and FIG. 6 is an enlarged view of a nip between feed rollers of the apparatus.

In these Figures, the copying machine comprises a frame or body 10 and a platen 11 acting as an image reading portion. An original feeding apparatus 12 acting as an original feeding means is disposed above the platen. The original feeding apparatus 12 comprises a stacking tray 13 on which a plurality of originals S' are stacked (original stack S), a separating portion 14 (conveying roller 14a and separating belt 14b) for separating the original S' from the original stack S on the stacking tray 13 on by one, a substantially U-shaped guide 15 for guiding the separated original S' to the platen 11, feed rollers 16 arranged at an appropriate position along the guide 15, for feeding the original S' toward the platen 11, and a whole-surface belt 17 for setting the original S' at a predetermined position on the platen 11.

At a downstream side of the stacking tray 13, there are arranged a semi-circular sheet feed or supply roller 18 and a sensor 19 for detecting a loading end of the original S'. Further, the conveying roller 14a of the separating portion 14 is rotated in an anti-clockwise direction (FIG. 4) and the separating belt 14b is disposed adjacent to the conveying roller 14a and is also rotated in an anti-clockwise direction. At an upstream side of the feed rollers 16 along the guide 15, there is arranged a sensor 20 for detecting the passage of the original S'.

Further, the whole-surface belt 17 is constituted by a driving roller 17a disposed at one end (left end in FIG. 4) of the platen 11, a driven roller 17b disposed at the other end (right end in FIG. 4) of the platen 11, a conveying belt 17c extending between and engaged by these rollers 17a, 17b. One end of a driving motor 21 is connected to a driving shaft 17a' of the driving roller 17a so that the conveying belt 17c can be rotated in a direction shown by solid arrows in FIG. 4 by means of the driving motor 21.

Incidentally, a clock plate 22 is connected to the other end of the driving shaft 21a and a photo-interrupter 23 is disposed near the clock plate 22. The photo-interrupter 23 controls a moving amount of the conveying belt 17c by counting the number of slits formed in the clock plate 22.

Further, at the other end of the platen 11, there are arranged a substantially U-shaped guide 23 and an ejector roller or sheet discharge roller 24, so that the original S' on the platen 11 can be ejected or discharged onto a sheet discharge tray 25 disposed above the conveying belt 17c. At an appropriate position along the guide 23, there is arranged a sensor 26 for detecting the original S'.

Next, an operation of the copying machine with the original feeding apparatus will be explained.

Now, an example where two originals S' are simultaneously positioned on the platen 11 will be described.

(1) The originals S' are stacked on the stacking tray 13 with images thereon turned upside.

(2) By depressing a copy start button (not shown), the supply roller 18 and the separating portion 14 are rotated to separate the lowermost original S'1 from the original stack and to feed it toward the feed rollers 16.

(3) When a predetermined time is elapsed after a leading end of the original S'1 has passed through the sensor 20, the separating portion 14 and the roller 18 are stopped. In this way, the lowermost or first original S'1 is stopped in such a manner that the leading end of the original abuts against the feed rollers 16 and a predetermined loop is formed in the original (FIG. 5A) to correct the skew-feed of the original.

(4) When the separating portion 14 and the roller 18 are stopped, the feed rollers 16 and the whole-surface belt 17 are rotated normally in the direction shown by the arrow to convey the original toward the platen 11.

Figure 5A:
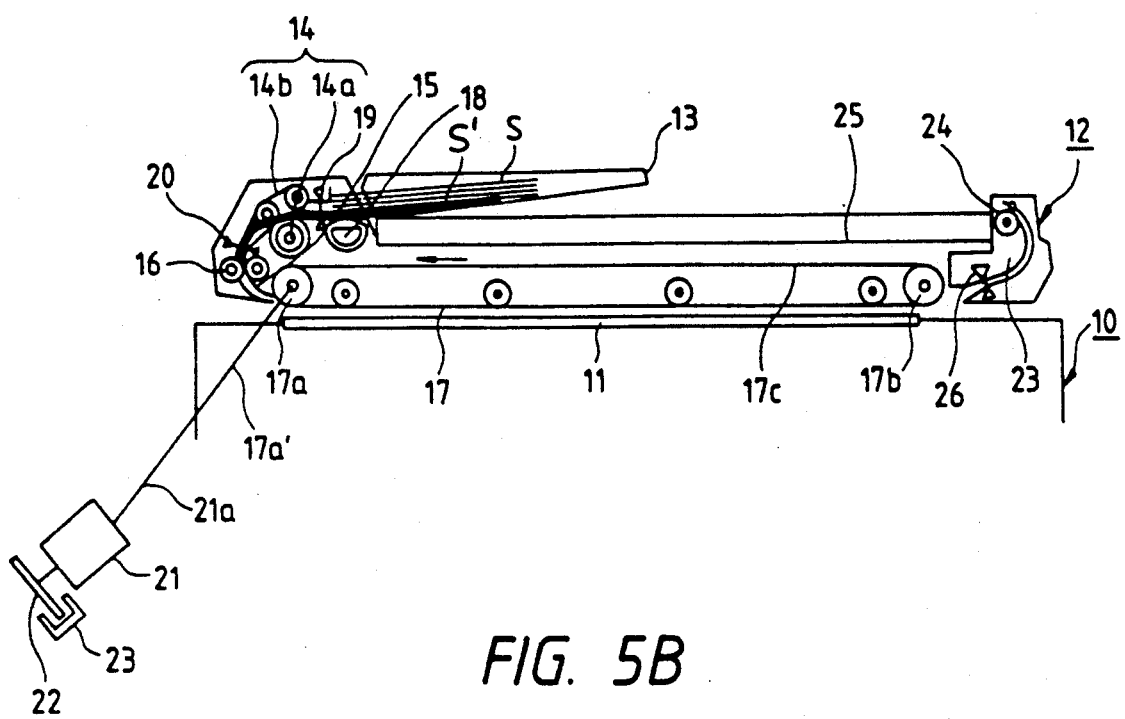
FIGS. 5A to 5F are elevational views of the original feeding apparatus according to the present invention, for explaining the operation thereof.
Figure 5B:
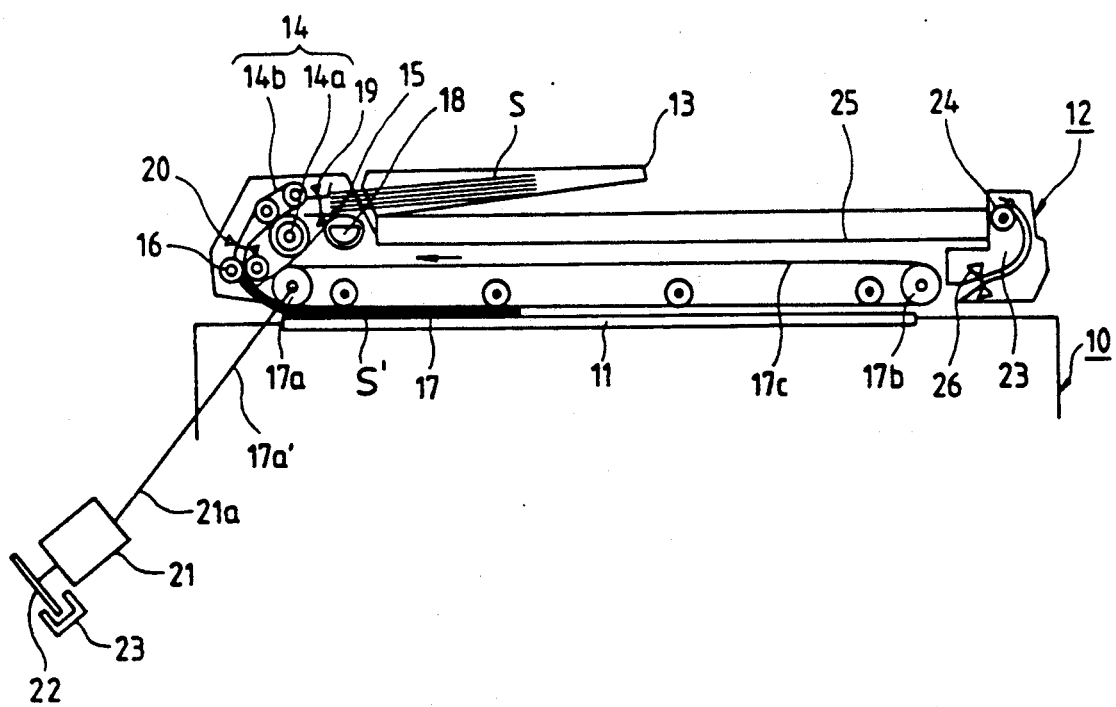
Figure 6A:
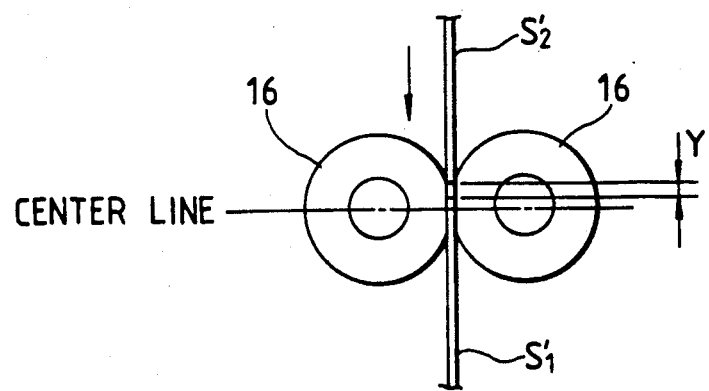
FIG. 6A is an enlarged view of a nip between feed rollers of the apparatus of FIG. 4.

(5) When a trailing end of the first original S'1 has passed through the sensor 20 and reaches the nip between the feed rollers 16, the rollers 16 and the belt 17 are stopped (FIG. 5B). Now, the feeding amount of the original is controlled by counting the number of the slits of the clock plate 21 by means of the photo-interrupter 22 to seek the original advancing amount from when the leading end of the original has passed through the sensor 20. Incidentally, on the basis of the counted value, when it is judged that the trailing end of the original is near the stopping position, the advancing speed of the original is decreased (by reducing the supply of the voltage to the driving motor), thus facilitating the positioning of the original.

Figure 1A:
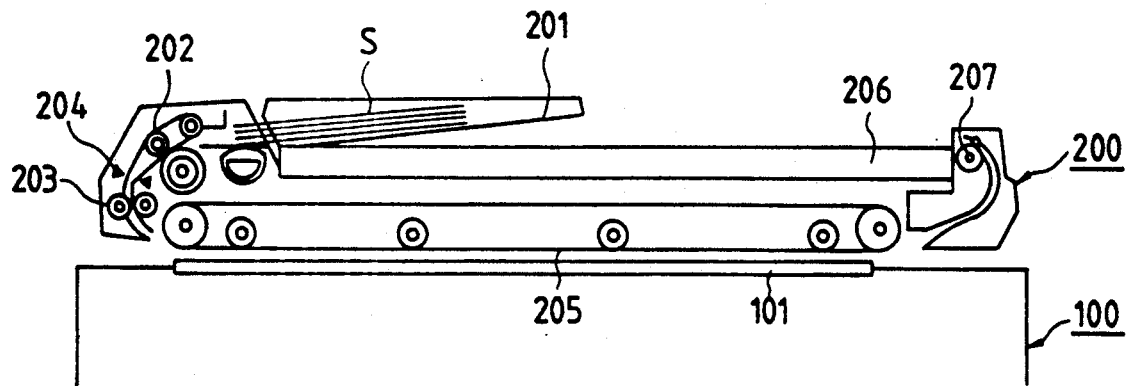
FIGS. 1A to 1H are elevational views of a conventional original feeding apparatus, for explaining the operation thereof.
Figure 1B:
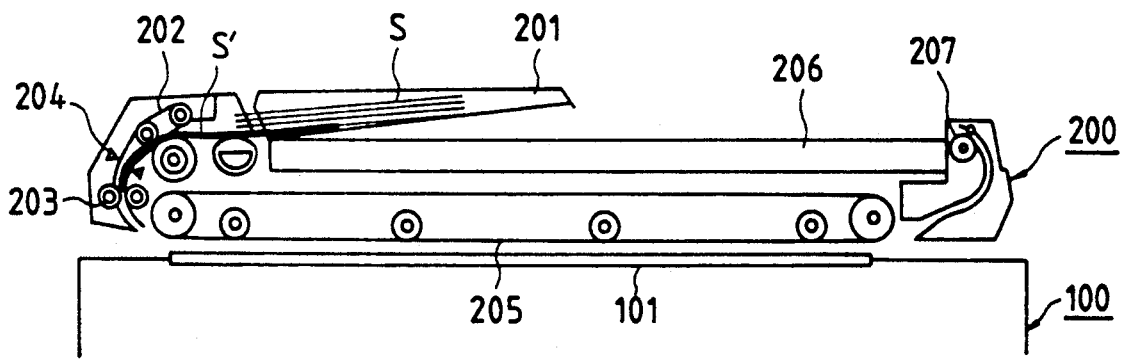
Figure 1C:
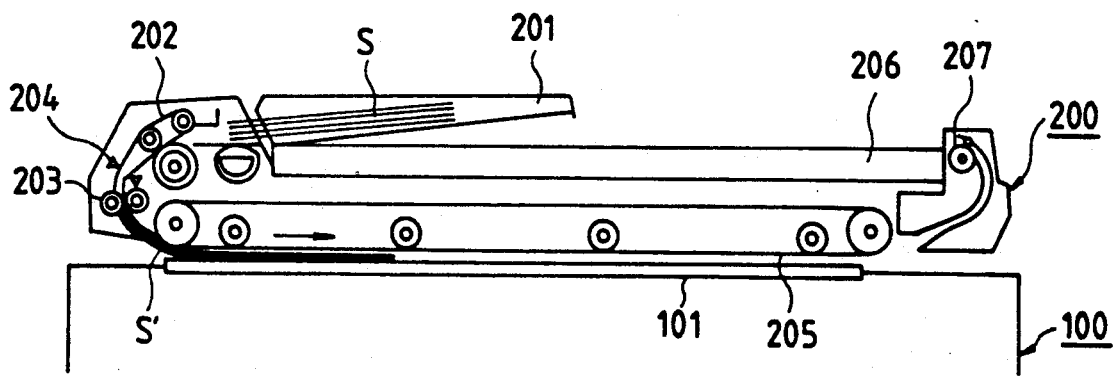
Figure 1D:
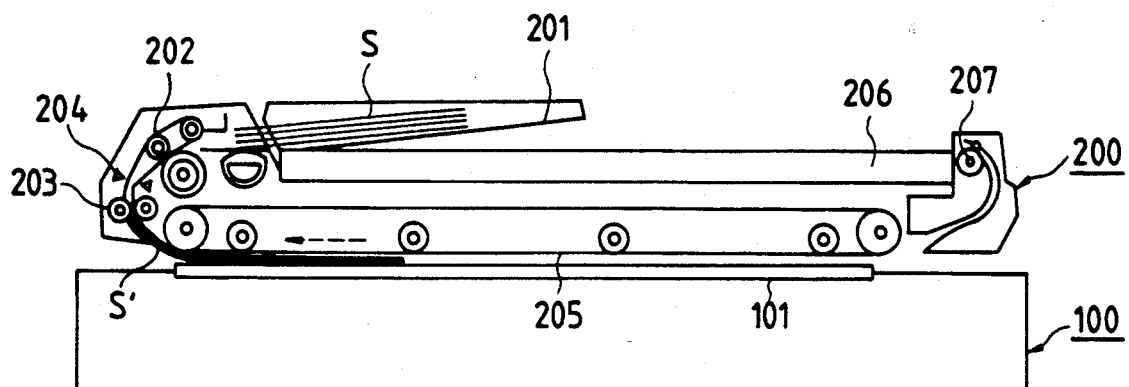
Figure 1E:
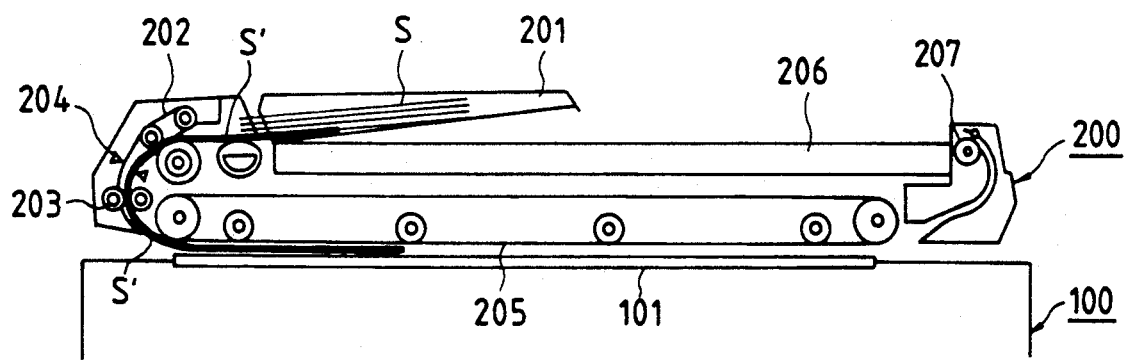
Figure 1F:
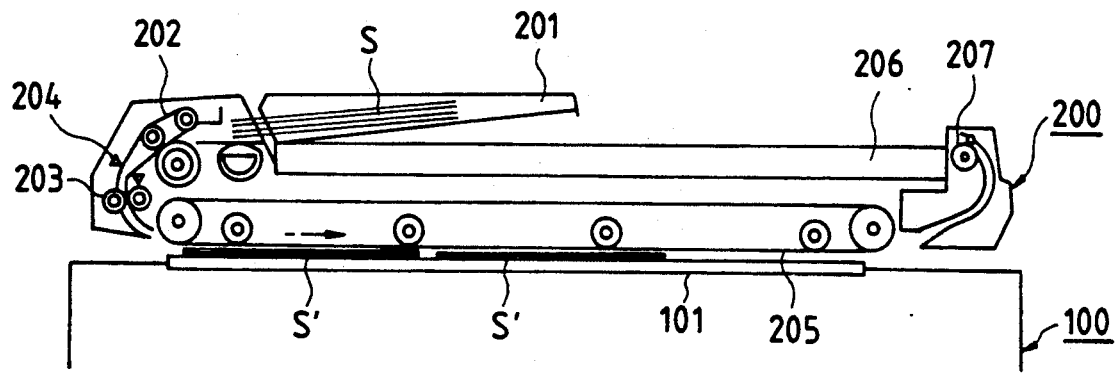
Figure 1G:
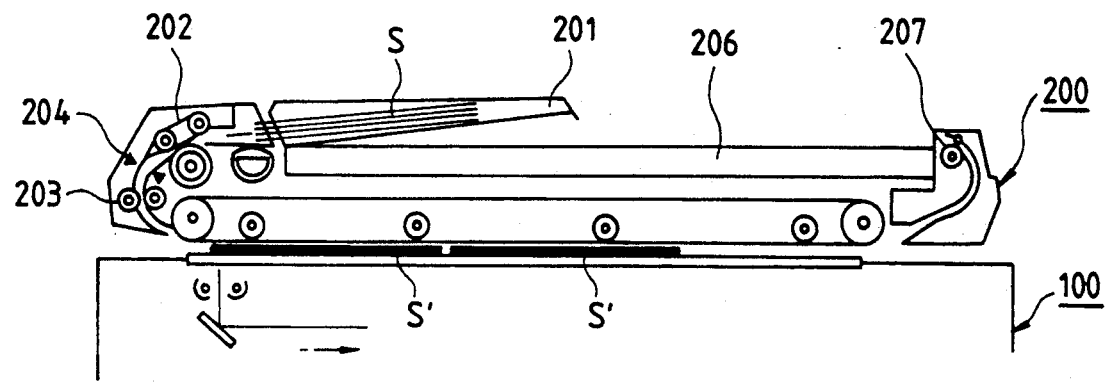
Figure 1H:
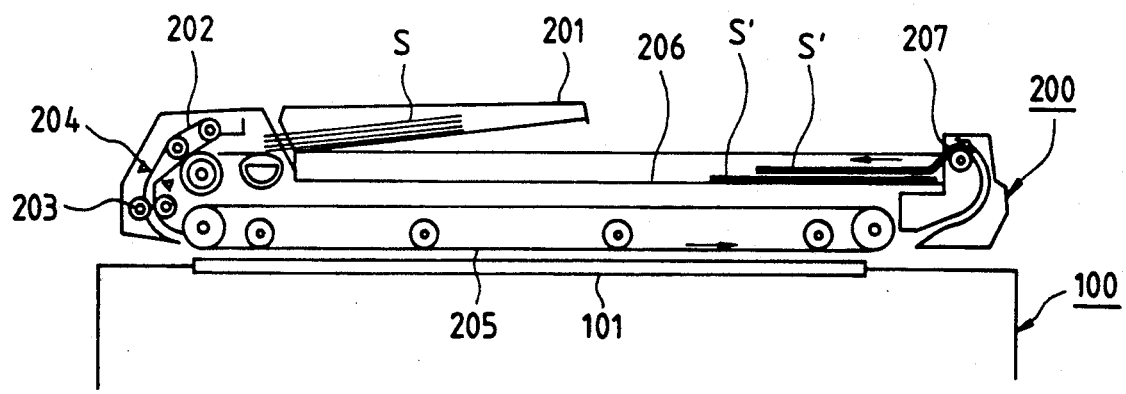
Figure 2:
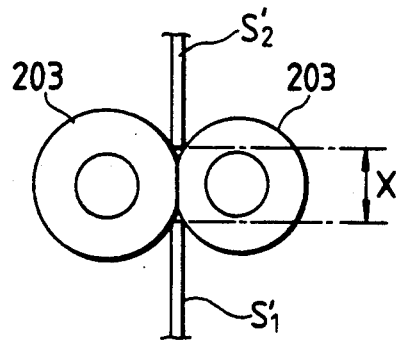
FIG. 2 is an enlarged view showing a nip between feed rollers of the conventional original feeding apparatus.
Figure 3:
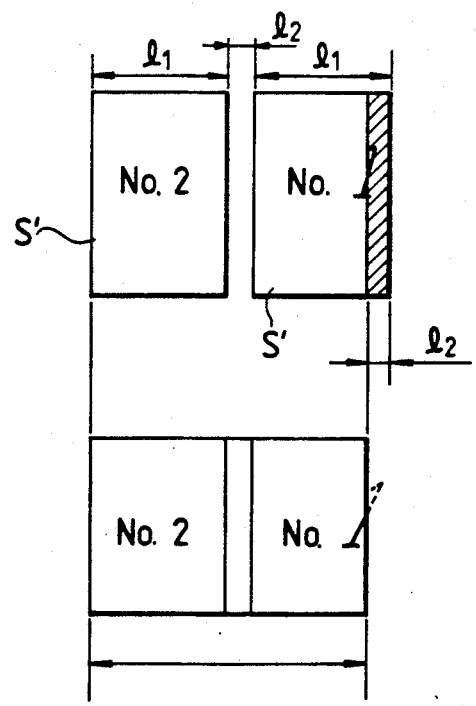
FIG. 3 is a plan view of images printed on a recording medium by the conventional original feeding apparatus.
Figure 5C:
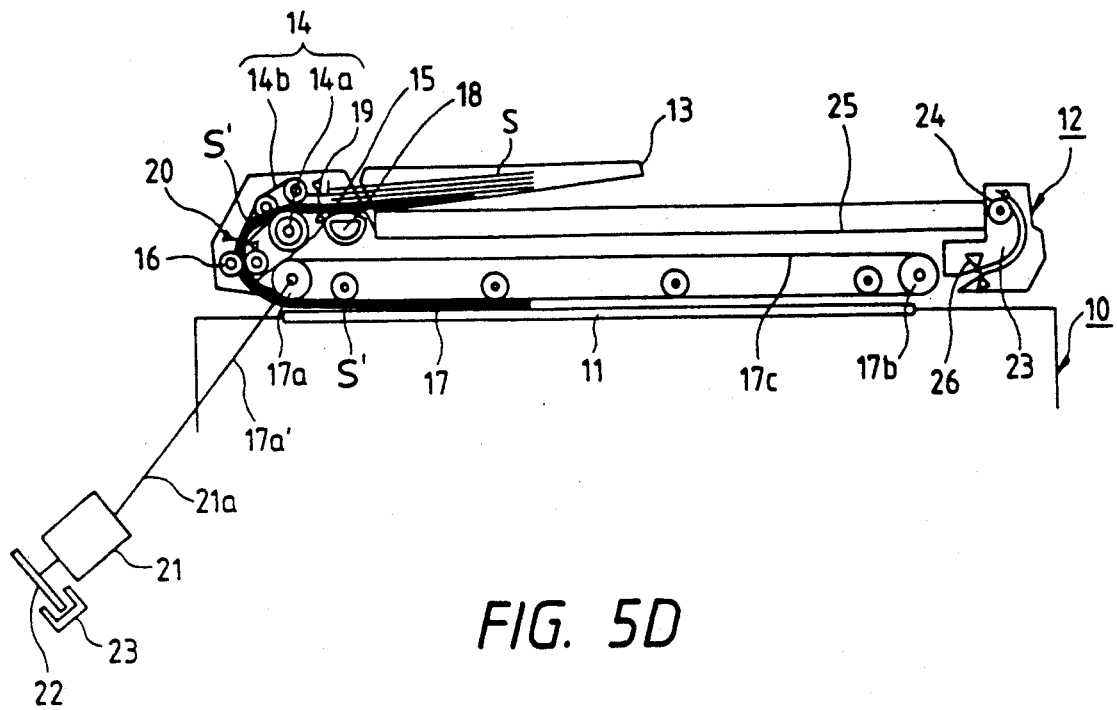
Figure 6B:
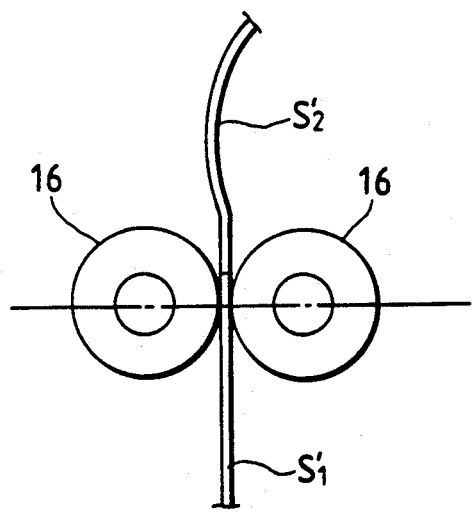
FIG. 6B is an enlarged view of a nip between feed rollers according to another embodiment.
Figure 7:
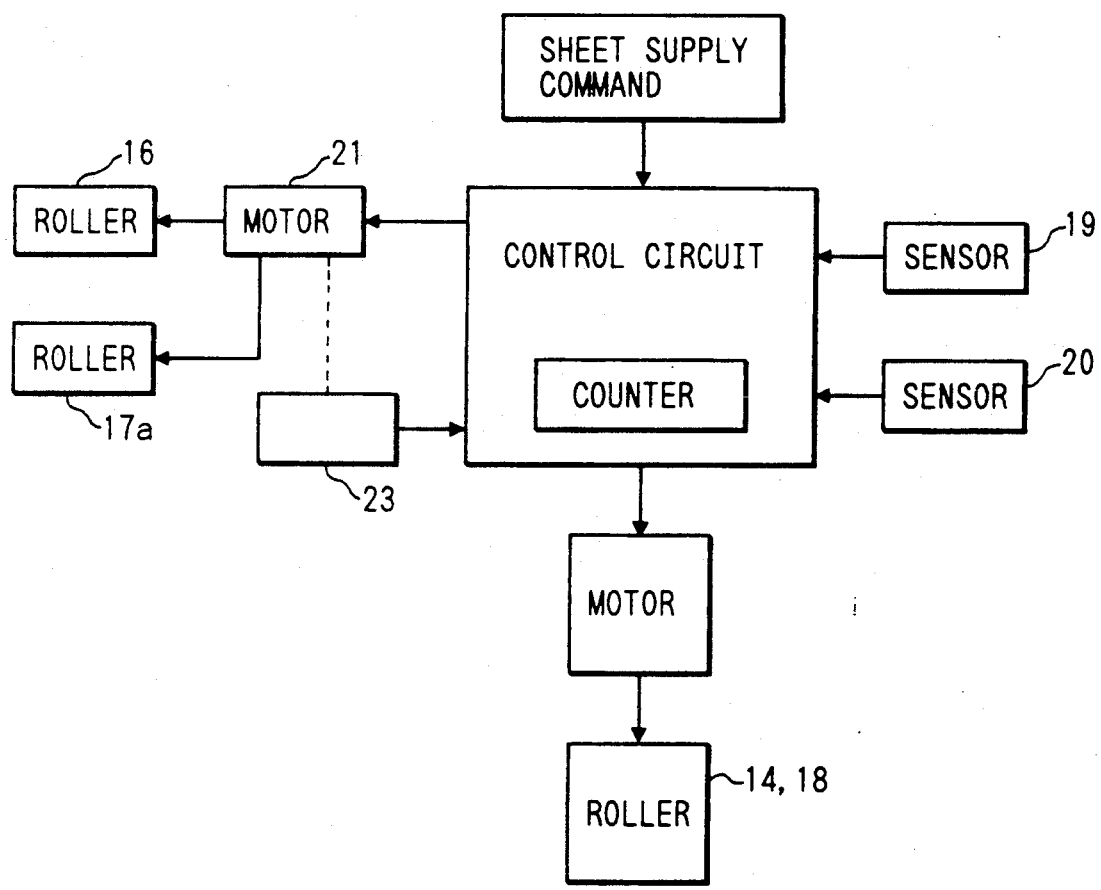
FIG. 7 is a block diagram of a control system for the original feeding apparatus according to the present invention.

(6) When the trailing end of the first original S'1 is pinched by the nip between the feed rollers (FIGS. 5B and 6A), the roller 18 and the separating portion 14 are rotated again to feed a next or second original S'2 in the same manner as the above step (3). As a result, the second original is stopped in such a manner that the leading end of the original is abutted against the feed rollers 16 and a predetermined loop is formed in the original (FIG. 5C). As apparent from FIG. 6A, in this case, since the trailing end of the first original is pinched between the nip, a distance or clearance Y between the trailing end of the first original S'1 and the leading end of the second original S'2 will be smaller than the distance X described with respect to FIG. 3. Further, by setting the stopping position of the trailing end of the first original to a further upstream of the nip, the distance Y can be position reduced or eliminated. Since the second original tends to enter the nip due to the reaction force of the loop, if the trailing end of the first original is protruded from the nip toward the upstream side thereof, the second original is guided by a wedged cavity defined by the peripheral surfaces of the feed rollers 16 to abut against the trailing end of the first original (Y=0) (FIG. 6B). When the rollers 16 are rotated, the second original enters into the nip by the reaction force of the loop.

Figure 5D:
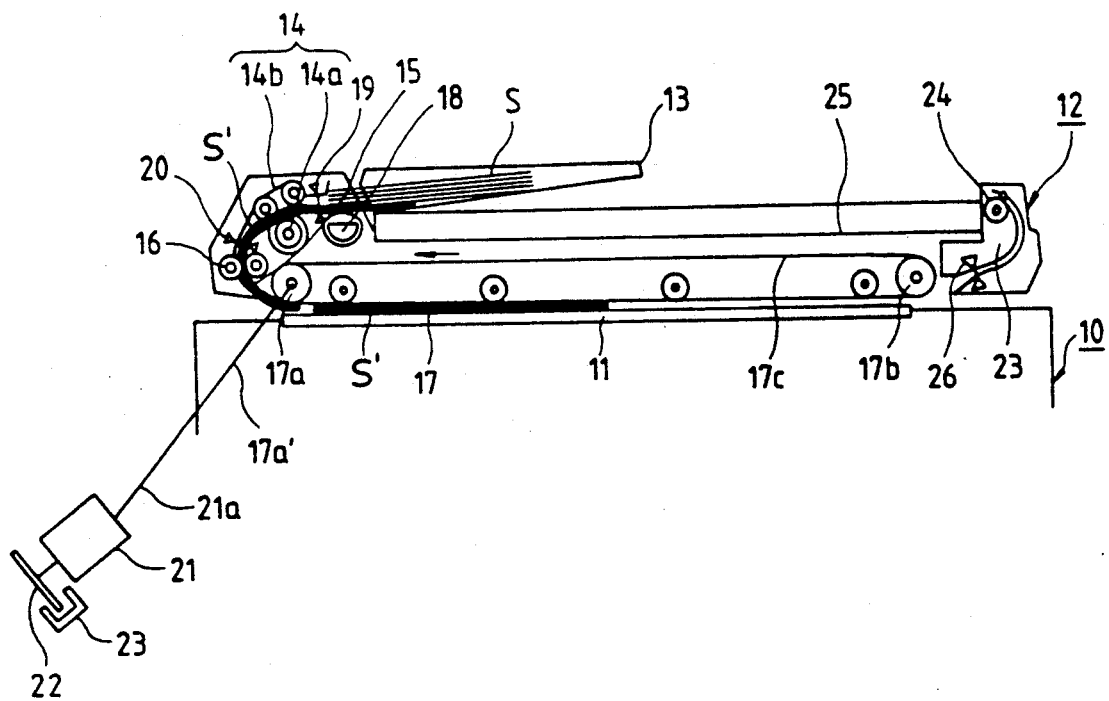

(7) When the separating portion 14 and the roller 18 are stopped, the rollers 16 and the belt 17 are rotated normally again to feed two (first and second) originals toward the platen 11 (FIG. 5D).

Figure 5E:
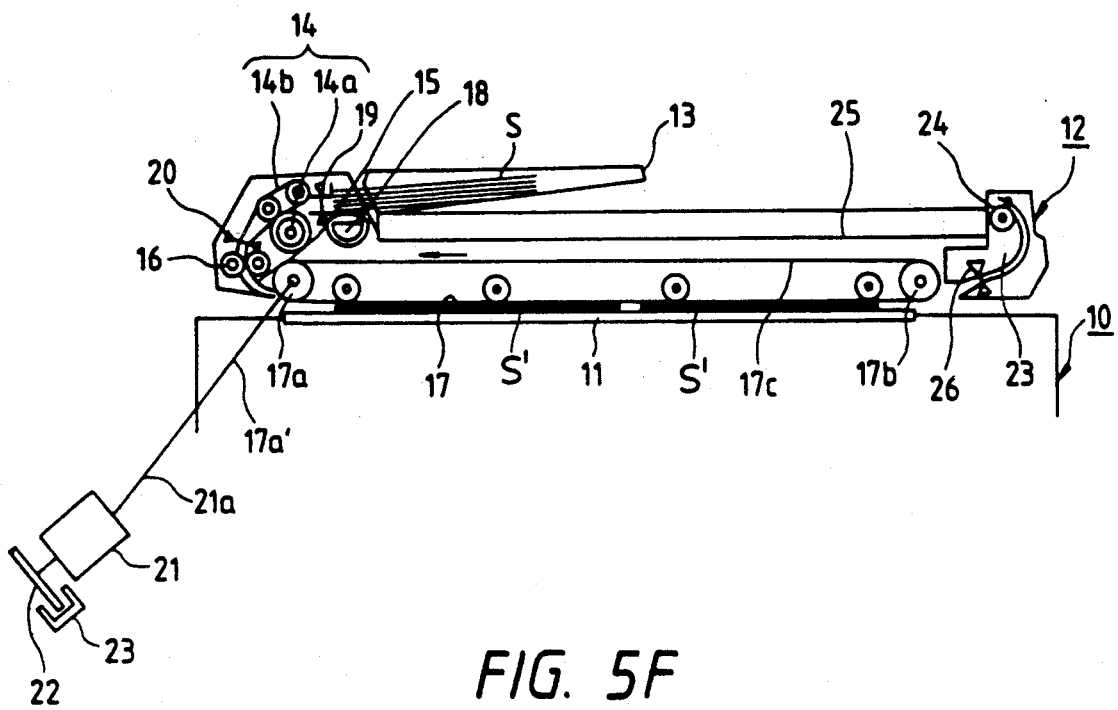

(8) When the trailing end of the second original has passed through the sensor 20 and reaches a predetermined position on the platen 11, the rollers 16 and the belt 17 are stopped (FIG. 5E). Also, in this case, the feeding amount of the originals is controlled by counting the number of slits of the clock plate 21 by means of the photo-interrupter 22. In this way, the two originals are rested on the platen 11 with a minute distance therebetween.

(9) After the originals have been positioned on the platen, an optical system (not shown) provided in the copying machine 10 starts a scanning operation. The scanning operation is continuously performed through the first and second originals. In synchronous with this scanning (reading) operation, a single sheet (recording medium) having a size equal to a total length of the first and second originals is fed from a cassette 301 by means of a supply roller 302.

The sheet is stopped by regist rollers 303 and is fed in synchronous with a position of developed images formed on a photosensitive drum 304 (on which images of the first and second originals read are projected). As a result, the images of two originals are printed on the single copy sheet. By repeating such operations, a desired number of copies can be obtained. Incidentally, in FIG. 4, the reference numeral 305 denotes a fixing device, and 307 denotes a sheet discharge tray.

Figure 5F:
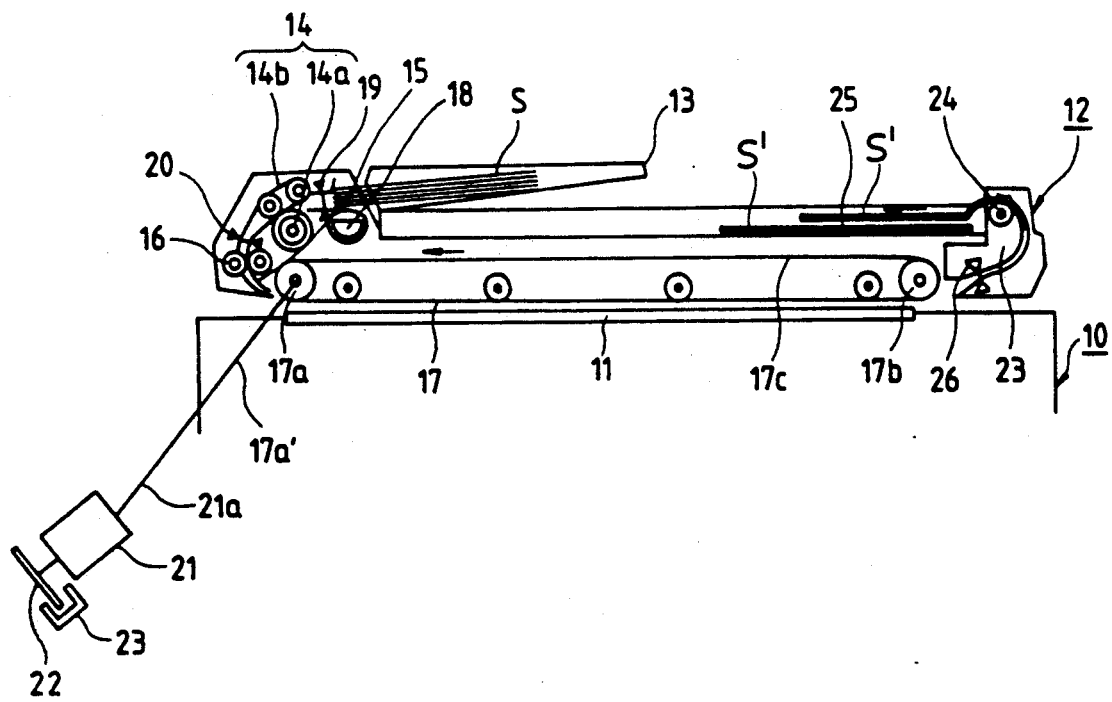

(10) After the reading operation, the belt 17 and the roller 24 are rotated to eject the two originals on the platen onto the tray 25 (FIG. 5F).

The above cycles are repeated until there is no original on the tray 13. In this way, it is possible to rest a plurality of originals on the predetermined position with a minimized distance therebetween by stopping the trailing end of the preceding original into the nip and by abutting the leading end of the next original against the trailing end of the preceding original.

In the above steps (4) and (5), while the feeding speed of the first original from the position where the loop is formed in the original to the position where the trailing end of the original is pinched between the nip was the same as the normal original feeding speed, such speed may be delayed to enhance the accuracy for positioning the trailing end of the original in the nip. Further, the feeding speed of the first original may be delayed after the trailing end of the first original has just passed through the sensor 20, so that the accuracy for positioning the trailing end of the original in the nip can be improved.

In the above embodiment, while the original feeding apparatus 12 included the separate or discrete stacking tray 13 and discharge tray 25, the apparatus may be designed so that the read original S' is returned to the same stacking tray 13. Further, while an example that two originals S' are placed on the platen 11 and printed on a single recording medium was explained, three, four or more originals S' may be placed on the platen 11 and copied on a single recording medium.

Further, while an example that images of a plurality of originals S' are printed on one surface (front surface) of a single recording sheet (single-side printing) was explained, images of a plurality of originals S' may be printed on the other surface (back surface) of the single recording medium by turning over the recording medium in the copying machine. In addition, while the present invention was applied to the copying machine, it may, of course, be applied to a laser printer, image reader (reading apparatus) and the like.

Figure 8:
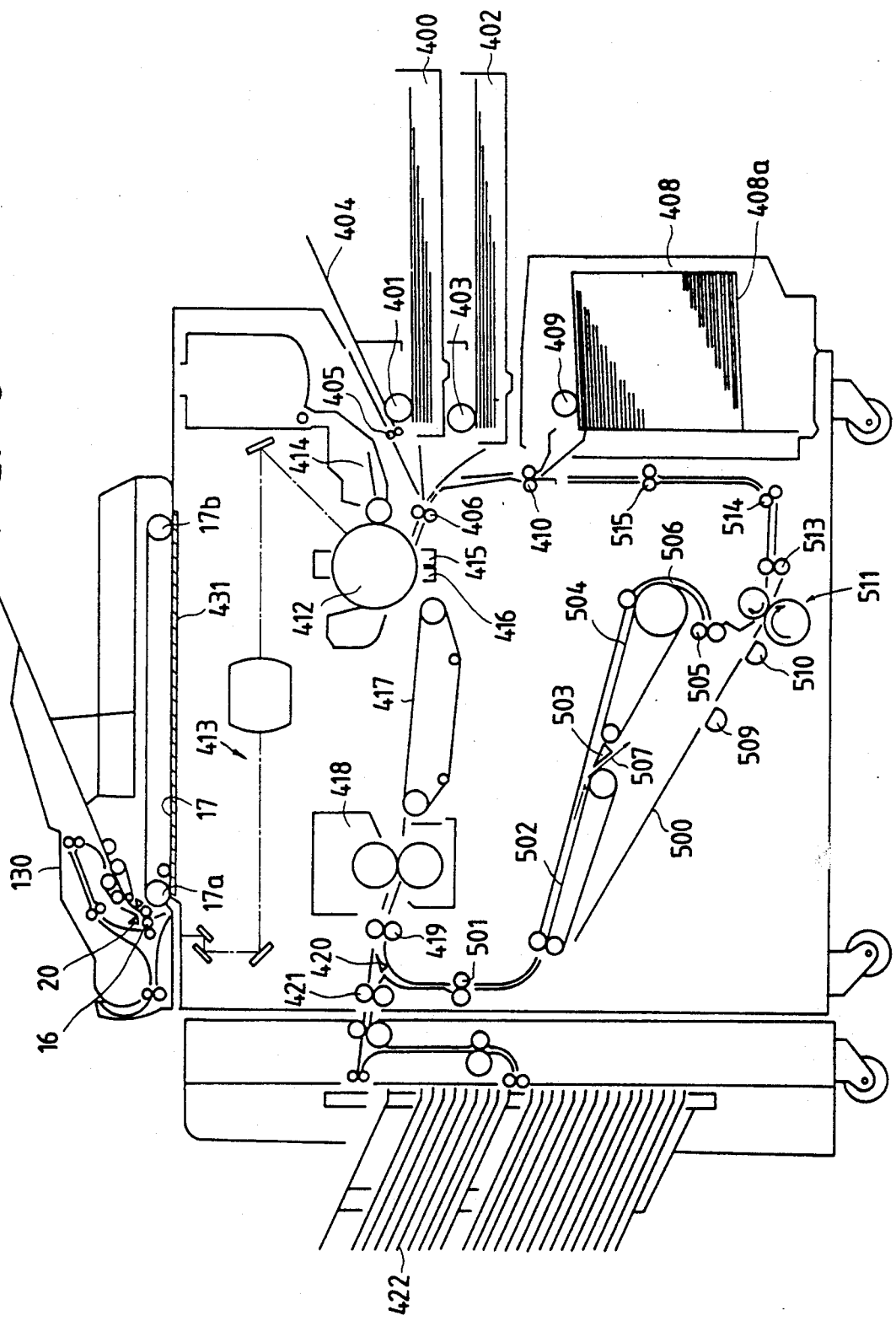
FIG. 8 is an elevational view of an image forming system according to another embodiment of the present invention.

Now, a double-sided printing copying machine will be explained with reference to FIG. 8.

Sheets (recording mediums) stacked in an upper cassette 400 are separated one by one by means of a separating claw and a supply roller 401 and each separated sheet is fed to regist rollers 406. On the other hand, sheets stacked in a lower cassette 402 separated one by one by means of a separating claw and a supply roller 403 and each separated sheet is fed to the regist rollers 406. A manual sheet insertion guide 404 is provided for introducing a sheet one by one to the resist rollers 406 through rollers 405. A sheet stacking device (deck type) 408 is provided with an intermediate plate 408a which can be lifted and lowered by means of a motor and the like, so that sheets stacked on the intermediate plate can be separated one by one by means of a supply roller 409 and a separating claw to be fed to conveying rollers 410.

The reference numeral 412 denotes a photosensitive drum; 413 denotes a reading optical system; 414 denotes a developing device; 415 denotes a transfer charger; and 416 denotes a separating charger. These elements 412–416 constitutes an image forming portion.

The reference numeral 417 denotes a conveying belt for conveying the sheet on which the image was formed; 418 denotes a fixing device; 419 denotes conveying rollers; and 420 denotes a flapper. The sheet on which the image was formed is directed to ejector rollers are sheet discharge rollers 421 by the flapper 420 and then is fed to a sorter 422. Incidentally, in place of the sorter, an ejector tray may be provided.

The reference numeral 130 denotes an automatic original feeding apparatus wherein the original is positioned one by one on a platen 431 and is read by the optical system. With respect to a single original positioned on the platen, an image is formed on the photosensitive drum in accordance with the number of copies which is set, and a plurality of sheets to be copied are fed from either cassette 400 or 402 or deck 408 whenever the image is formed on the photosensitive drum. The registration between the image on the photosensitive drum and the sheet is effected by the regist rollers 406.

When the desired number of copies are obtained, the originals are discharged from the platen, and next originals are positioned on the platen. And, the cycle is repeated in the same manner as described above.

An intermediate tray 500 stacks the sheets on which the images were formed, when the images are to be copied on both surfaces of each sheet (double-sided print) or when the images are superimposed on the single surface of each sheet (multi-print). The reference numeral 501 denotes a conveying rollers; 502 denotes a conveying belt; 503 denotes a flapper; 504 denotes a conveying belt; and 505 denotes conveying rollers.

When the double-sided or both face print is effected, the sheet is introduced into the intermediate tray 500 through a path 506 with the imaged surface thereof turned upside. On the other hand, when the multi-print is effected, the sheet is introduced into the intermediate tray 500 through a path 507 with the imaged surface thereof turned downside.

The sheets stacked on the intermediate tray 500 are separated and re-fed one by one from the bottom by means of auxiliary rollers 509, 510 and a pair of reversible separating rollers 511. The sheet re-fed is directed to the image forming portion through conveying rollers 513, 514, 515, rollers 410 and the regist rollers 406. After the images are formed on the sheet, the sheet is ejected as mentioned above.

With respect to the original rested on the platen, the single-sided printing is effected in accordance with the number of copies which is set, and the printed sheets are stacked on the intermediate tray 500. Thereafter, the original is turned over, and then is again introduced onto the platen. The image of the original is read by times equal to a desired number of copies to be obtained. The read image is printed on the sheet fed whenever the reading is effected. The finished sheets are assorted by the sorter 422 with a proper page sequence.

On the other hand, in some cases, one set of copies are formed whenever the original is circulated by the automatic original feeding apparatus. In this case, since, even when a plurality of same copies are to be obtained, a group of copies with the proper page sequence can be obtained, a desired number of assorted copies can be obtained without any sorter. When the double-sided printing is effected according to this method, the images on both surfaces of a single original are continuously read and are continuously printed on the front and back surfaces of a single sheet, and then the original is ejected. Thereafter, regarding the both surfaces of the next and other originals, the same cycles are repeated, thus obtaining a group of assorted copies on both surfaces of which the images are formed.

While the present invention was explained with respect the specific embodiment thereof, it is not limited to such embodiment.

For example, in positioning the original, the counting of the timer may be started in accordance with the original size information after the leading end of the original has been detected by the sensor 20 (disposed at the downstream side of the rollers 16) or may be started from when the rollers 16 are rotated.

Next, the countermeasure to the clearance between the first and second originals which may be created by the original feeding apparatus of FIGS. 4-8 will be explained with reference to FIGS. 9 to 13.

Since the feeding control regarding the originals S' by means of the original feeding apparatus 12 is substantially the same as mentioned above, the detailed description thereof will be omitted.

Explaining the difference or characteristic, a stopping position of the whole-surface belt 17, i.e., a stopping position of the trailing end of the second original S' is altered or changed in comparison with the stopping position thereof in the normal mode.

Figure 9A:
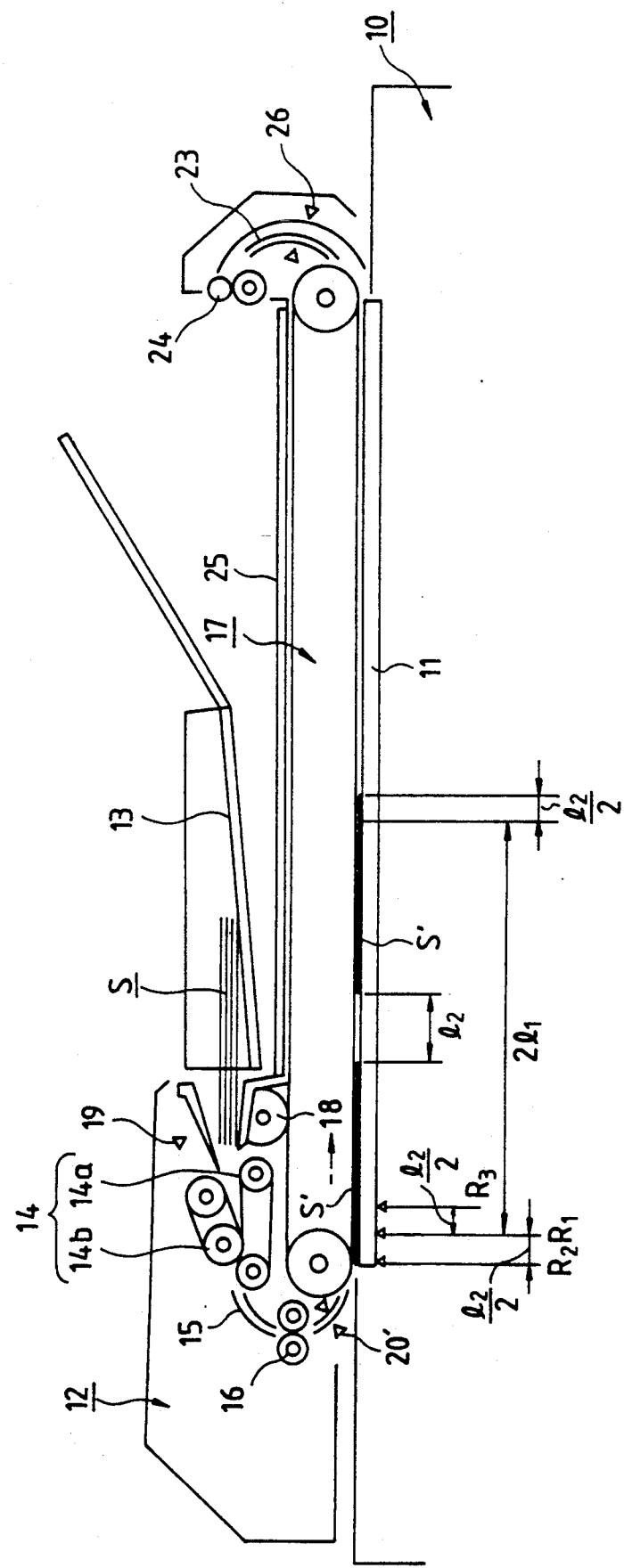

In the normal mode, the whole-surface belt 17 is stopped when the clock is advance by a predetermined count after the original S' has passed through the sensor 20', so that the original is stopped at a position $R_1$ shown in FIG. 9A (position from which the reading by means of the reading optical system 27 is initiated). To the contrary, in a one scan mode, when a distance between the first original S' and the second original S' is $l_2$, the stopping position is so controlled that the trailing end of the second original S' is stopped at a position $R_2$ shifted toward an upstream side from the position $R_1$ (in the normal mode) by a distance $l_2/2$ (refer to FIG. 9A). Consequently, the leading end of the first original S' protrudes from the image reading area by a distance $l_2/2$. Accordingly, when the reading of the original images by means of the reading optical system 27 is initiated from the position $R_1$, as shown in FIG. 12, the lacked widths of the first and second originals S' will be $l_2/2$, respectively.

Figure 12:
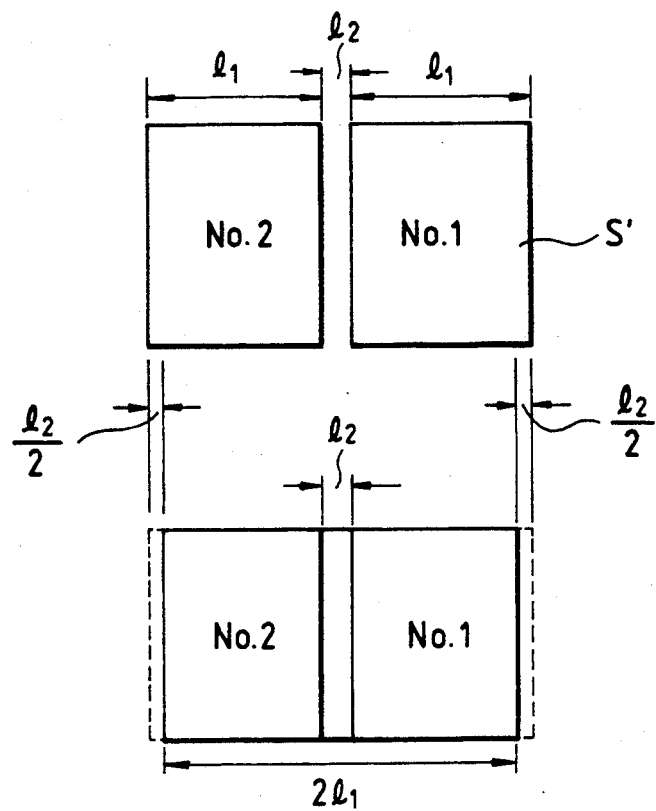
FIG. 12 is a plan view of images printed on a recording medium by the original feeding apparatus according to the present invention.

When the stopping position of the originals is controlled in this way, as shown in FIG. 12, although the lacked widths of the first and second originals become $l_2/2$, respectively, since such lack or disappearance occurs only at edge areas of the originals where the density of image information is low or zero, the danger of disappearance of the necessary image information will be more reduced than the conventional case where the width $l_2$ of the first original is lacked.

Then, the originals S' are read (FIG. 9B), and, after the reading, the whole-surface belt 17 and the sheet discharge rollers 24 are rotated normally to eject the originals S' on the platen 11 onto the discharge tray 25 (FIG. 9C).

Figure 10:
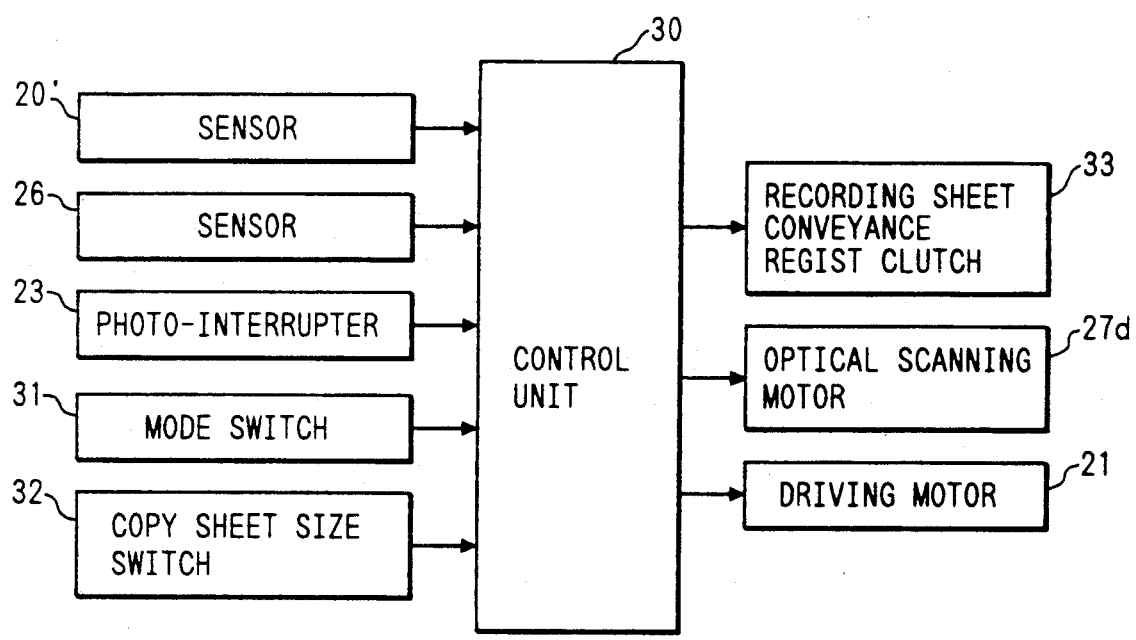
FIG. 10 is a block diagram of a control system of the image forming system of FIG. 8.
Figure 11:
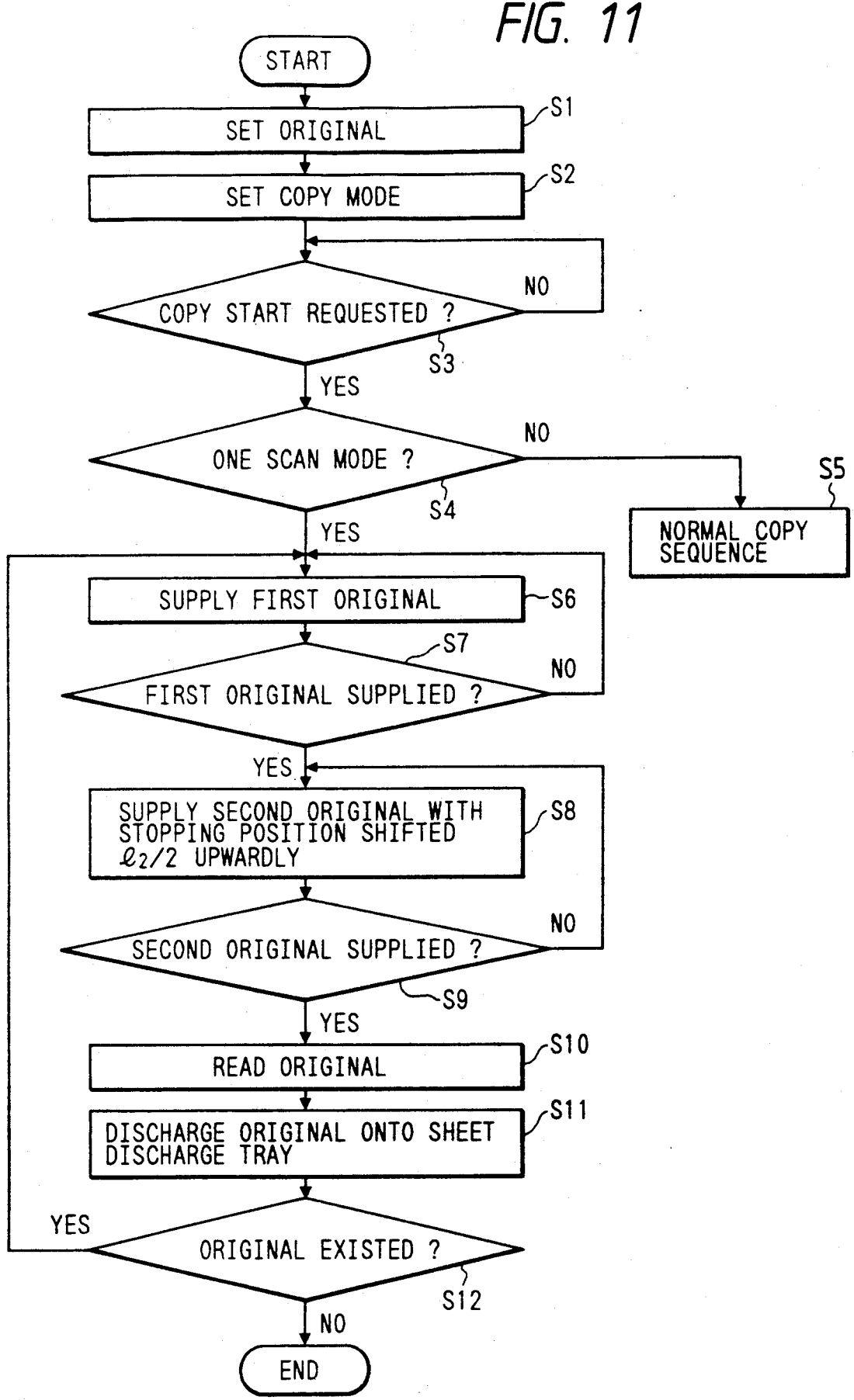
FIG. 11 is a flow chart showing the controlling contents of the control system.

Next, a control means of the image forming system for performing the feeding control as mentioned above will be explained. As shown in FIG. 10, the control means or controlling portion 30 comprises a one-chip microcomputer including a ROM and a RAM. The controlling contents shown in FIG. 11 are stored in the ROM, and the original feeding apparatus 12 is controlled in accordance with the controlling contents.

To one input terminal of the controlling portion 30, the sensors 20', 26 and photo-interrupter 23 are connected, and the controlling portion receives signals from these sensors 20', 26 and photo-interrupter 23 to calculate the size and the number of the originals S' on the platen 11 and the shifting amount of the whole-surface belt 17. Further, a mode switch 31 for setting the copy mode and a copy sheet size switch 32 for setting the size of a copy sheet as a recording medium (which switches are arranged in an operation panel (not shown) of the copying machine 10) are connected to the other input terminal of the controlling portion 30.

When the one scan mode (wherein the images of a plurality of originals S' are printed on one surface of the single copy sheet) is set by the mode switch 31 and the size of the copy sheet is set by the copy sheet size switch 32, the controlling portion 30 calculates the shifting amount of the stopping position of the originals in the one scan mode. More particularly, the controlling portion 30 calculates the shifting amount of the originals by performing the following calculation on the basis of the aforementioned input signals:

$$[(\Sigma l_1 + \Sigma l_2) - l_3] \div 2.$$

where, $\Sigma l_1$ is the total length of the originals, $\Sigma l_2$ is the total clearance between the originals, and $l_3$ is a length of the recording sheet (copy sheet).

The driving motor 21 of the original feeding apparatus 12 is connected to an output terminal of the controlling portion 30, which motor 21 is controlled on the basis of the calculated shifting amount. For example, when two originals each having the A4 size (length of 210 mm) are simultaneously rested on the platen, if the distance between two originals is 5 mm (determined by the distance of the nip between the feed rollers 16), a value of $\Sigma l_1 + \Sigma l_2$ (i.e., total original length plus total clearance between the originals) becomes $210 \times 2 + 5 = 425$ mm. In this case, if the size of the copy sheet is designated to A3 (length of 420 mm) and the magnification is designated to 100%, the shifting amount becomes:

$$[425 - (420/1.00)] \div 2 = 2.5 \text{ mm}.$$

Accordingly, when the printing is effected in this mode, the copy including the lacked areas of 2.5 mm regarding the first and second originals S' will be obtained.

On the other hand, when the copy sheet is designated to A4 (longitudinal) and the magnification is designated to 50%, the shifting amount becomes:

$$[425 - (210/0.50)] \div 2 = 2.5 \text{ mm}.$$

Thus, the original stopping position is shifted by 2.5 mm as the same as the above case.

Next, the original feeding sequence performed by the controlling portion 30 will be explained with reference to a flow chart shown in FIG. 11.

First of all, in a step S1, the originals each having the size A4 are stacked on the stacking tray 13 with the imaged surfaces thereof turned upside to form the original stack S. Then, in a step S2, for example, the one scan mode is set by the mode switch 31 and the A3 size is set by the copy sheet size switch 32.

Next, in a step S3, it is judged whether the copy start signal exists or not, and if the copy start is requested (i.e., if YES), the sequence goes to a step S4, where it is judged whether the one scan mode or the normal mode is required. If the normal mode is required, the sequence goes to a step S5, where the printing is initiated in the normal copy sequence.

On the other hand, if the one scan mode is required, the sequence goes to a step S6, where a first original S' is supplied, and in a step S7 it is judged whether the supplying of the first original S' has been finished or not. If finished (YES), in a step S8 a second original S' is supplied. In this case, the second original is fed in such a manner that the trailing end of the second original S' is positioned at the stopping position $R_2$ shifted toward the upstream side by the distance $l_2/2$ in comparison with the stopping position $R_2$ in the normal mode.

Then, in a step S9, it is judged whether the or not. If finished (YES), in a step S10 the originals S' are read. In this way, the images of two originals S' are printed on a single surface of the copy sheet having the size A4 with the same lacked areas of the images of the first and second originals S' (see FIG. 12).

After the reading, in a step S11, the originals S' are discharged onto the sheet discharge tray 25, and in a step S12 it is judged whether any originals S' remain on the stacking tray 13. If remains (YES), the sequence returns to the step S6, and the same cycles are repeated until the there is no original on the stacking tray.

In the illustrated embodiment (FIG. 9), while the original stopping position $R_2$ was shifted toward the upstream side by the distance $l_2/2$ from the reading position to equalize the lacked widths of the first and second originals S' (to prevent the localization of the lacked area only in the first original S'), alternatively, the reading start position of the reading optical system 27 may be shifted toward a downstream side by a distance $l_2/2$ as shown in FIG. 9A while keeping the original stopping position as same as that in the normal mode.

That is to say, the whole-surface belt 17 is stopped when the trailing end of the second original S' reaches a predetermined position. This predetermined position corresponds to the original stopping position $R_1$ in the normal mode. Then, the reading of the originals is effected by the scanning of the reading optical system 27. However, in this case, an optical scanning motor 27d (FIG. 10) is controlled by the controlling portion 30 to alter or change the reading start position to a position $R_3$ shifted toward the downstream side by the distance $l_2/2$ from the reading start position $R_1$ in the normal mode or a book mode. In this way, as similar to the previous embodiment, the lacked width of the first original S' will be equalized to that of the second original S'.

Further, while the original stopping position $R_2$ was shifted toward the upstream side by the distance $l_2/2$ from the reading position $R_1$ in the previous embodiment (FIG. 9) and while the reading start position was shifted toward the downstream side by the distance $l_2/2$ from the reading position $R_1$ in the normal mode to equalize the lacked widths of the first and second originals S', alternatively, the timing of energization of a regist clutch 33 of the recording sheet feeding mechanism may be delayed by $l_2/2$ by means of the controlling portion 30.

Figure 13:
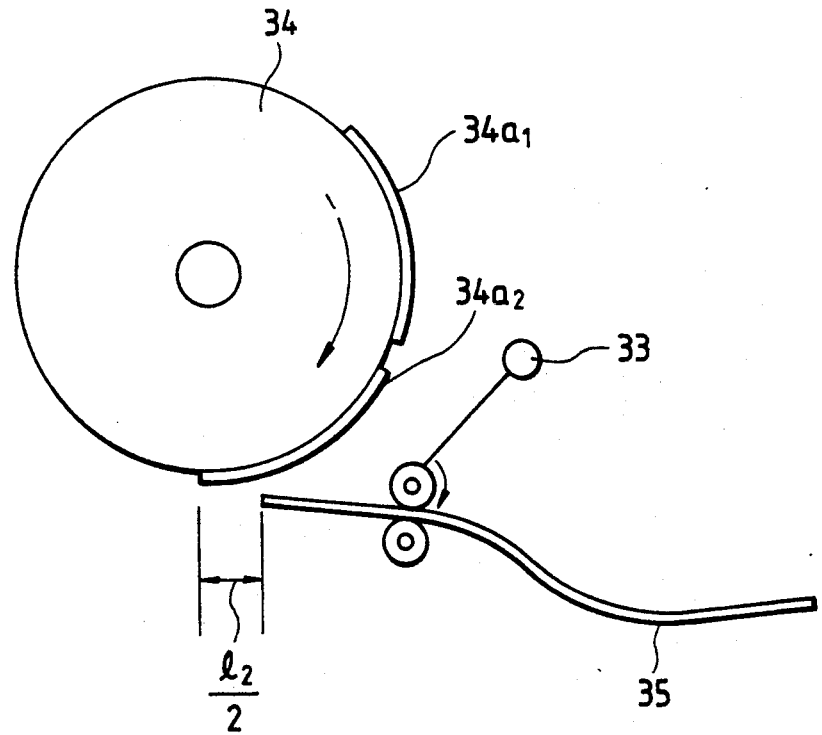
FIG. 13 is an explanatory view showing an alteration.

That is to say, as shown in FIG. 13, the timing between the movements of an image information $34a_1$ of the first original and of an image information $34a_2$ of the second original given on the photosensitive drum 34 and the transferring of these images onto a recording sheet 35 may be delayed (initiation of the supplying the recording sheet is delayed) by a time corresponding to the distance $l_2/2$ by controlling the regist clutch 33 by means of the controlling portion 30, thus equalizing the lacked widths of the first and second originals S'.

Incidentally, the shifting amount between the first image information $34a_1$ and the second image information $34a_2$ and the recording sheet 35 corresponds to the distance $l_2/2$ when the magnification is 1 (100%); however, if the magnification is not 1 but $\alpha$, such shifting amount will be $(l_2/2) \times \alpha$. This is required for the reason that, since the image information $34a_1$ on the photosensitive drum 34 is an image which has already been magnified, the shifting amount of the recording sheet 35 must also be magnified.

Next, an example that the copies with the proper page sequence can be obtained will be explained with reference to FIGS. 14 to 19.

Figure 14:
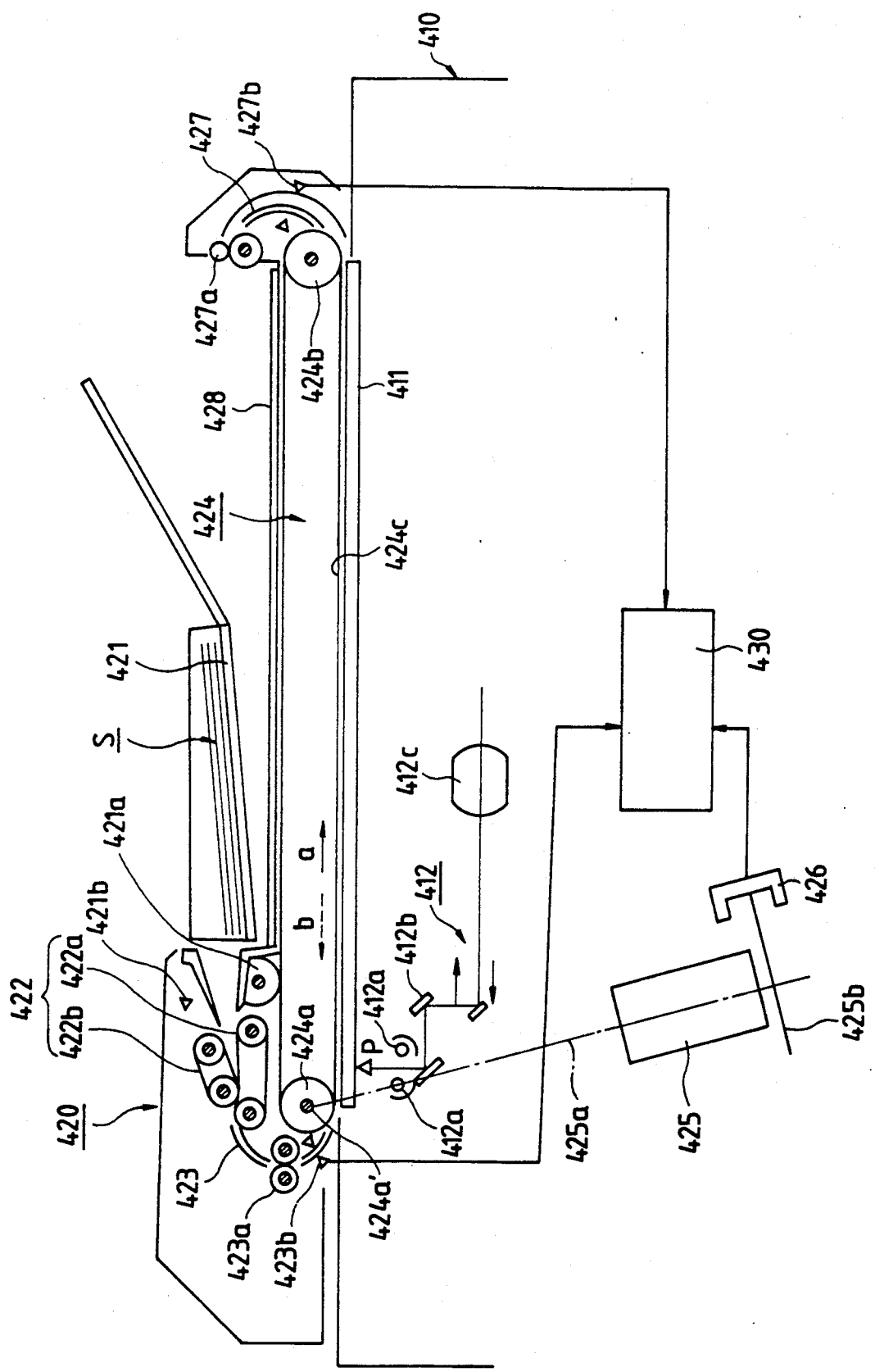
FIG. 14 is a schematic sectional view of an original feeding apparatus of an image forming system to which the present invention is applied, according to a further embodiment of the present invention.
Figure 15A:
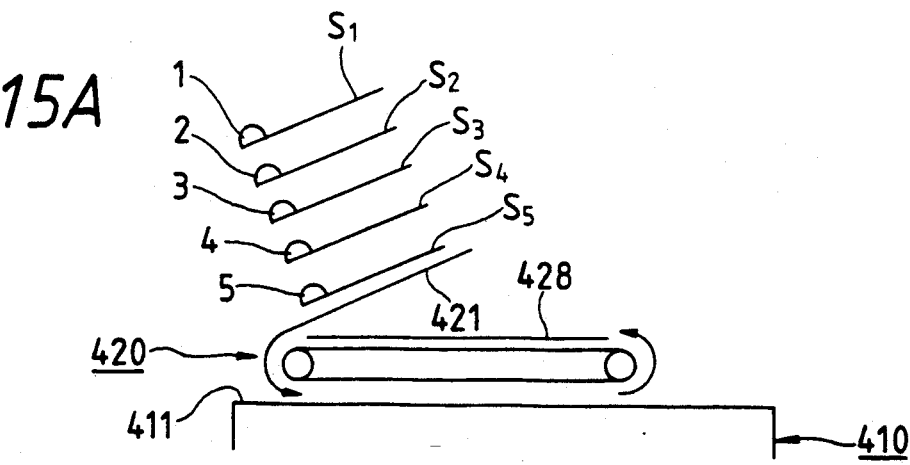
FIGS. 15A to 15G are schematic elevational views of the original feeding apparatus and the image forming system, for explaining the operation thereof, where images are printed on a single surface of a recording medium.
Figure 15B:
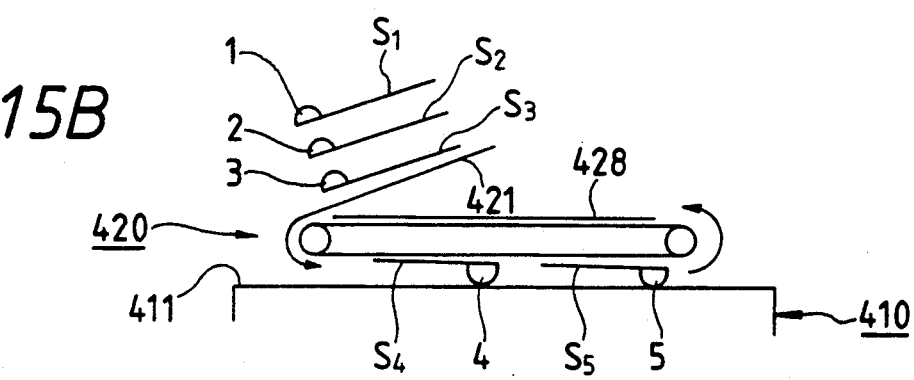
Figure 15C:
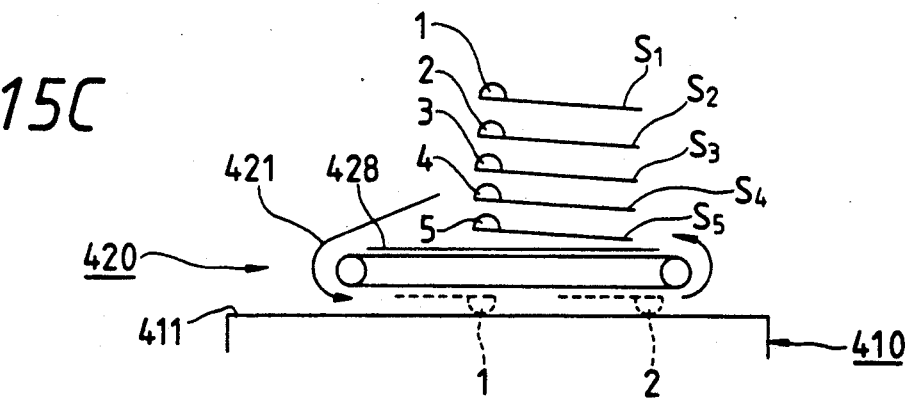
Figure 15D:
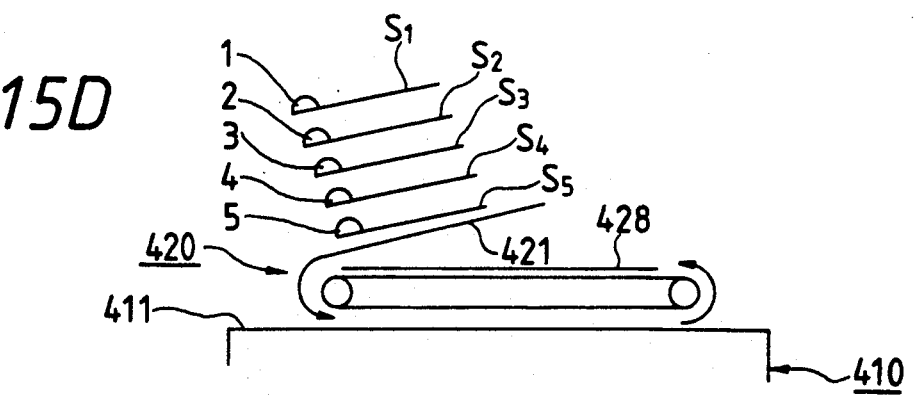
Figure 15E:
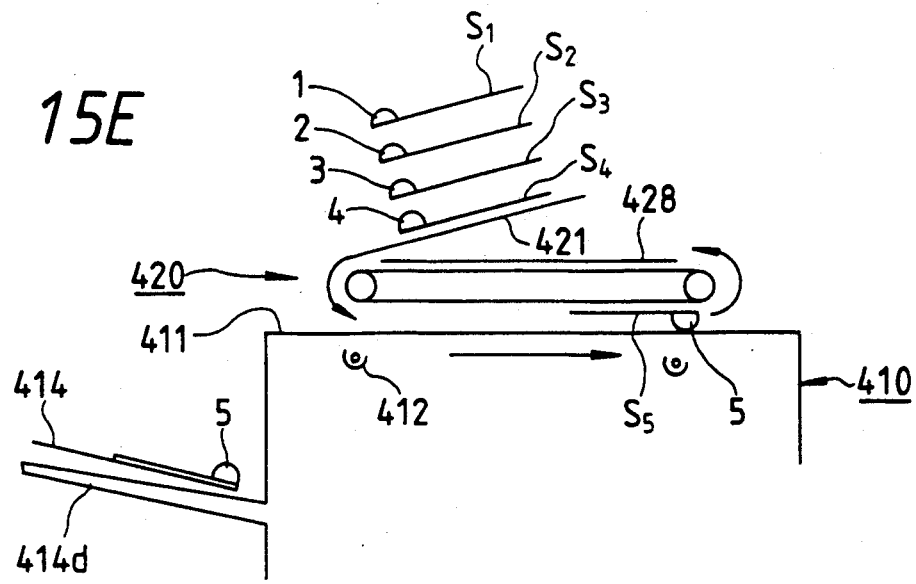
Figure 15F:
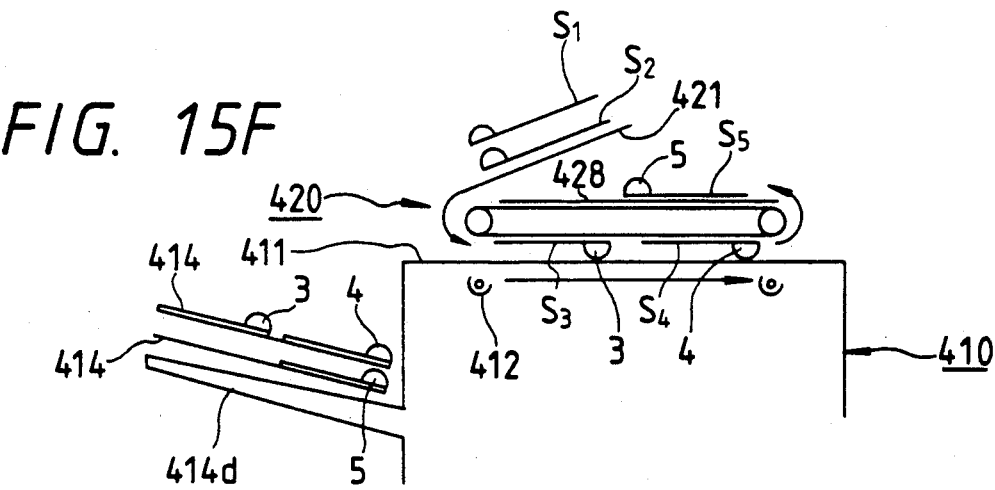
Figure 15G:
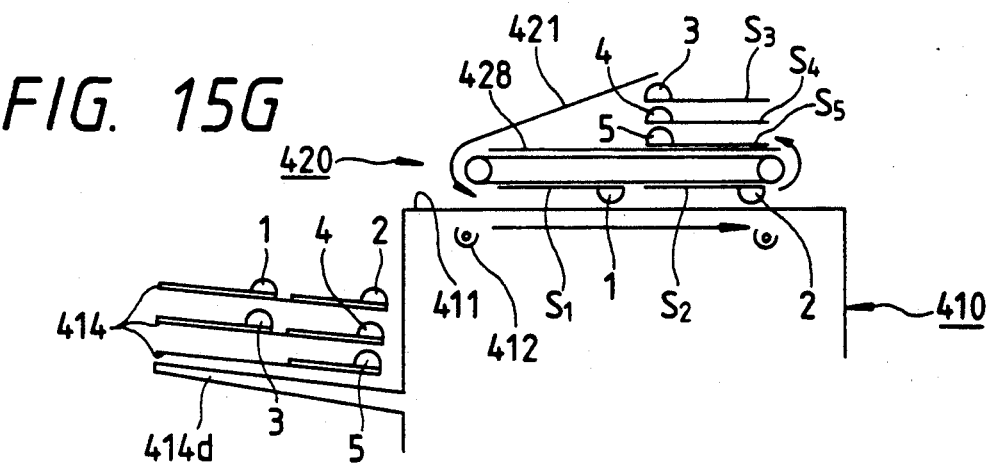
Figure 16A:
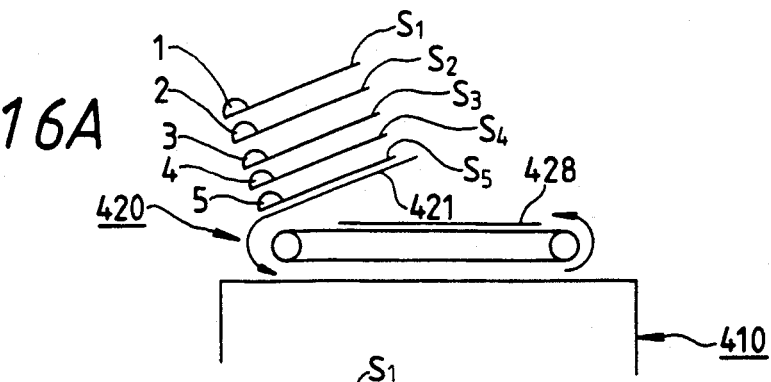
FIGS. 16A to 16D are schematic elevational views of the original feeding apparatus and the image forming system, for explaining the operation thereof, where images are printed on both surfaces of a recording medium.
Figure 16B:
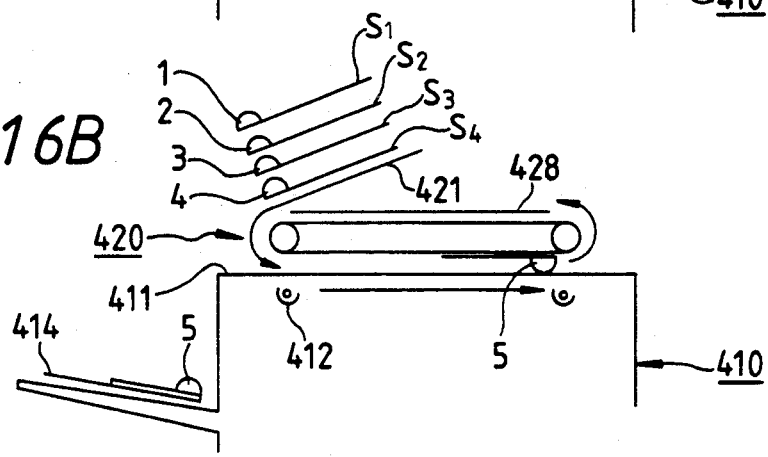
Figure 16C:
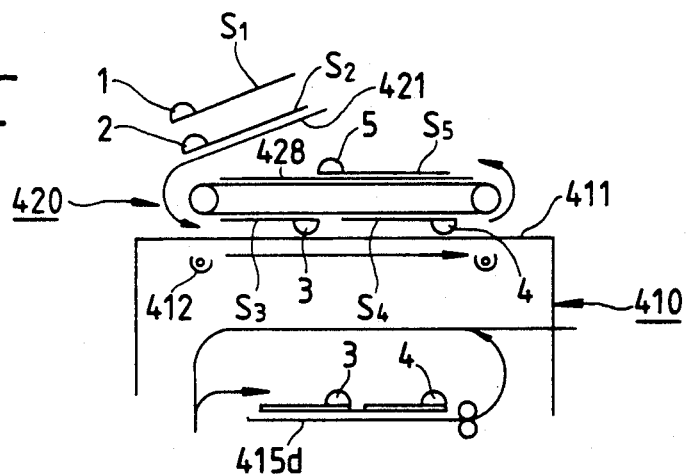
Figure 16D:
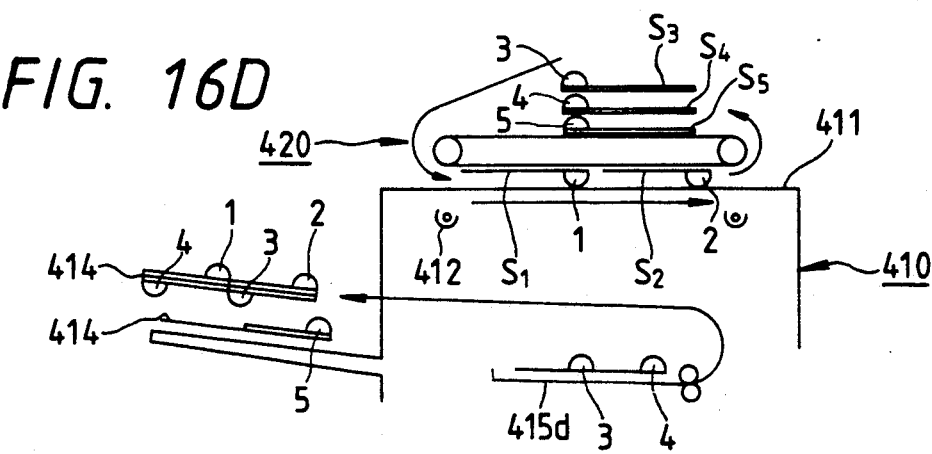
Figure 17:
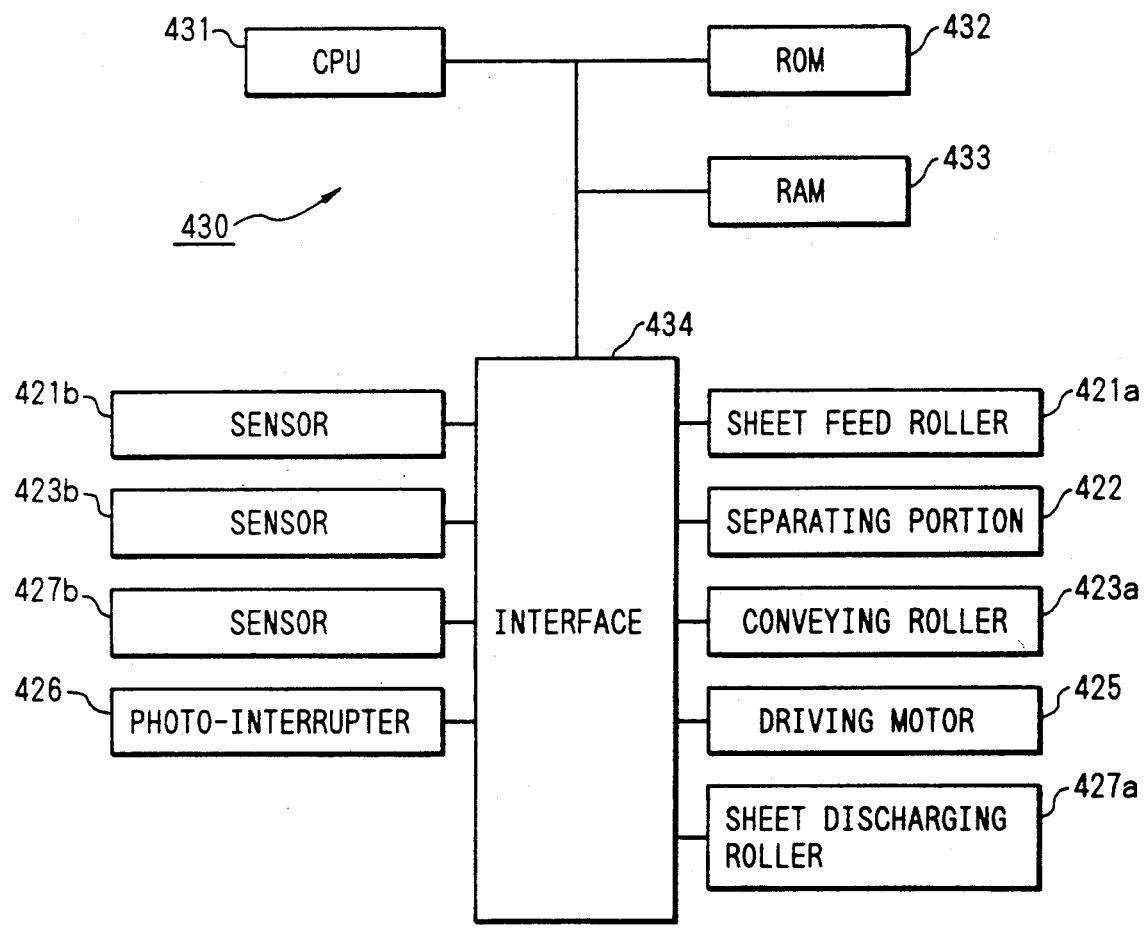
FIG. 17 is a block diagram of a control system of the image forming system.
Figure 18:
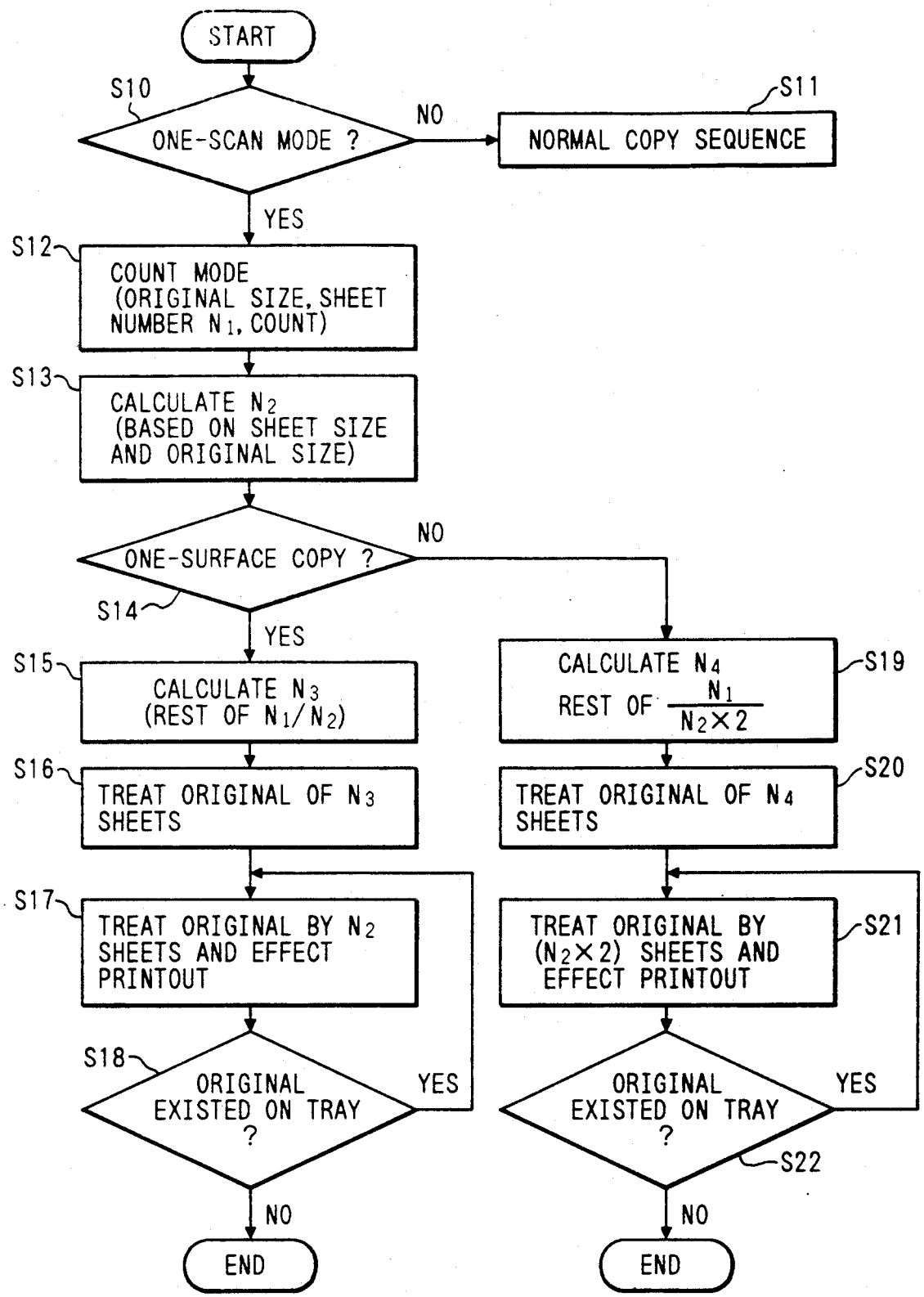
FIG. 18 is a flow chart showing the controlling contents of the control system.

FIGS. 14 to 19 show a further embodiment of the present invention, where FIG. 14 is a schematic sectional view of an original feeding apparatus of a copying machine to which the present invention is applied, FIGS. 15A to 15G and FIGS. 16A to 16D are schematic explanatory views for illustrating the operation of the original feeding apparatus, FIG. 17 is a block diagram of a control means for the copying machine and FIG. 18 is a flow chart showing the controlling contents for the control means.

In FIG. 14, the copying machine 410 has a platen 411 above which an original feeding apparatus 420 is disposed. As shown in FIG. 14, the original feeding apparatus 420 comprises a stacking tray 421 on which an original stack S is received, a separating portion 422 (conveying roller 422a and separating belt 422b) for separating an original from the original stack S on the stacking tray 421, a substantially U-shaped guide 423 for guiding the separated original to the platen 411, feed rollers 423a arranged at an appropriate position along the guide 423 and adapted to feed the original toward the platen 411, and a whole-surface belt 424 for setting the original at a predetermined position on the platen 411.

At a downstream side of the stacking tray 42, there are arranged a semi-circular sheet feed or supply roller 421a and a sensor 421b for detecting a leading end of the original.

Further, the conveying roller 422a of the separating portion 422 is rotated in an anti-clockwise direction (FIG. 14) and the separating belt 422b is disposed adjacent to the conveying roller 422a and is also rotated in an anti-clockwise direction to separate the original one by one from the bottom of the original stack S on the tray 421. Further, a sensor 423b for detecting the passage of the original is disposed at an appropriate position along the guide 423.

Further, the whole-surface belt 424 is constituted by a driving roller 424a disposed at one end (left end in FIG. 14) of the platen 411, a driven roller 424b disposed at the other end (right end in FIG. 14) of the platen 411, and a conveying belt 424c extending between and engaged by these rollers 424a, 424b. One end of a driving shaft 425a of a driving motor 425 is connected to a driving shaft 424a' of the driving roller 424a so that the conveying belt 424c can be rotated in directions shown by arrows a and b in FIG. 14 by means of the driving motor 425. Incidentally, a clock plate 425b is connected to the other end of the driving shaft 425a and a photo-interrupter 426 is disposed near the clock plate 425b. The photo-interrupter 426 controls a moving amount of the conveying belt 424c by counting the number of slits formed in the clock plate 425b.

Further, at the other end of the platen 411, there are arranged a substantially U-shaped guide 427 and an ejector roller or sheet discharge roller 427a (near an outlet of the guide 427), so that the original on the platen 411 can be ejected or discharged onto a sheet discharge tray 428 disposed above the conveying belt 424c. A sensor 427b for detecting the original is disposed at an appropriate position along the guide 427.

The copying machine 410 includes an optical reading system 412 acting as a reading means for reading the image of the original rested on the platen 411. The optical reading system 412 is constituted by an exposure lamp 412a, a scanning mirror 412b and a lens 412c and is so designed that the image of the original is scanned by moving the optical system by means of an optical scanning motor (not shown) while illuminating the original by the exposure lamp 412a, thereby directing the reflected light from the original to the photosensitive drum through the scanning mirror 412b and the lens 412c.

Next, an operation of the above-mentioned copying machine will be explained with reference to FIGS. 14, 15A to 15G and 16A to 16D.

First of all, an example that the image information is printed on a single surface of the recording sheet will be described with reference to FIGS. 14 and 15A to 15G.

As shown in FIG. 15A, the original stack S is set on the stacking tray 421 with imaged surfaces thereof turned upside. Now, it is assumed that five originals $S_1$, $S_2$, $S_3$, $S_4$ and $S_5$ each having a size of A4 and an image recorded on only one surface thereof are stacked onto the stacking tray 421. Then, when the one scan copy mode is selected by the mode selection switch (not shown) and the copy start switch (not shown) is depressed, the original feeding apparatus 420 is activated to create a count mode for counting the number of the originals.

In this count mode, the supply roller 421a and the separating portion 422 are driven to separate a lowermost or fifth original $S_5$ from the original stack on the stacking tray 421 and feed it to the feed rollers 423a until a leading end of the fifth original $S_5$ abuts against the feed rollers 423a to form a loop in the original.

Then, the feed rollers 423a and the whole-surface belt 424 are rotated in the direction shown by the arrow a (FIG. 14) to feed the original $S_5$ toward the platen 411. When a predetermined clock is advanced after the trailing end of the original $S_5$ has passed through the sensor 423b (i.e., the trailing end of the original $S_5$ reaches near a reading start position P shown in FIG. 14), the original is temporarily stopped.

Then, the supply roller 421a and the separating portion 422 are driven to separate and feed a next or fourth original $S_4$ until a leading end of this original abuts against the feed rollers 423a to form a predetermined loop in this original.

Thereafter, the feed rollers 423a and the whole-surface belt 424 are rotated in the direction shown by the arrow b (FIG. 14) to further move the fifth original $S_5$ from near the reading start position P to the right by a distance corresponding to the size of the original (the length of the A4 size original) and to feed the fourth original $S_4$ near the reading start position P, thereby positioning two originals $S_5$, $S_4$ adjacent to each other on the platen 411 (refer to FIG. 15B).

Then, a third original $S_3$ is separated and fed until a leading end of the original abuts against the feed rollers 423a to form a predetermined loop in this original.

Thereafter, the feed rollers 423a, whole-surface belt 424 and ejector rollers 427a are rotated in the direction shown by the arrow a (FIG. 14) to eject the fifth original $S_5$ onto the sheet discharge tray 428, to move the fourth original $S_4$ to a position where the fifth original $S_5$ was positioned, and to move the third original $S_3$ near the reading start position P; and then, these elements 423a-427a are stopped.

The above-mentioned cycles are repeated until there is no original on the stacking tray 421 (refer to FIG. 15C).

Incidentally, in counting the number of the originals, the originals may be continuously fed without stopping the originals.

By counting the above cycles, the number $N_1$ of the originals can be counted, and the counted value $N_1$ is stored in a RAM 33 (FIG. 17) of the controlling portion 30. Further, during such counting operation, the size of the original is detected, and the detected size information is also stored in the RAM 33.

After the above-mentioned count mode is finished, as shown in FIG. 15D, the originals on the discharge tray 428 are again set on the stacking tray 421 as the same attitude as the previous one, and then the copy start switch (not shown) is depressed again.

Now, it is assumed that each original has A4 size, the recording sheet has A3 size, the magnification is 100% and the number $N_2$ of the originals to be simultaneously fed to the platen 411 is two. Further, since the number $N_1$ of the originals is five and the single-sided printing is effected, the controlling portion 30 seeks the residual $N_3$ by dividing $N_1$ by $N_2$ (i.e., $N_3 = 1$; $5 \div 2 = 2 \times 2 + 1$).

When $N_3 = 1$ is calculated, the copying operation is effected in a mode wherein at first only the original corresponding to the last page is fed to the platen so that the image thereon is printed on a single recording sheet 414 and thereafter two originals are simultaneously fed to the platen 411 so that the images of these two originals are printed on a single recording sheet. That is to say, in response to the re-start signal, the supply roller 421a and the separating portion 422 are rotated to separate the lowermost or fifth original $S_5$ abuts against the feed rollers 423a to form a predetermined loop therein.

Then, the feed rollers 423a and the whole-surface belt 424 are rotated in the direction shown by the arrow a in FIG. 14 to feed the original $S_5$ toward the platen 411.

After the trailing end of the original $S_5$ has passed through the sensor 423b, the original $S_5$ is moved until the trailing end of the original S5 reaches a position spaced apart from the reading start position P on the platen 411 by a distance corresponding to the length of the original (length of A4 size). In this condition (FIG. 15E), the optical reading system 412 reads the image information of the original $S_5$ to form the image information on the photosensitive drum. The image formed on the photosensitive drum is transferred onto the recording sheet 414 and then the transferred image is fixed to the sheet.

When the reading is finished, the whole-surface belt 424 and the ejector rollers 427a are rotated in the direction shown by the arrow a in FIG. 14 to discharge the original $S_5$ from the platen 411 to the sheet discharge tray 428.

Then, the supply roller 421a an the separating portion 422 are rotated again to separate the fourth original $S_4$ (now a lowermost original) and to feed it until the leading end of the original $S_4$ abuts against the feed rollers 423a to form a predetermined loop in the original. Thereafter, the feed rollers 423a and the whole-surface belt 424 are rotated in the direction shown by the arrow a in FIG. 14 to feed the original $S_4$ toward the platen 411. The original $S_4$ is initially stopped when the trailing end of this original has passed through the feed rollers 423a.

Then, the whole-surface belt 424 is rotated reversely in the direction shown by the arrow b in FIG. 14 until the trailing end of the original $S_4$ abuts against the feed rollers 423a. Thereafter, the third original $S_3$ is separated from the original stack and is fed until the trailing end of this original abuts against the feed rollers 423a to form a predetermined loop therein.

Then, the feed rollers 423a and the whole-surface belt 424 are again rotated in the direction a in FIG. 14 until the trailing end of the original $S_3$ has passed through the sensor 423b and reaches the reading start position P on the platen 411.

In this way, two originals $S_4$ and $S_3$ are positioned on the platen 411 with a minute or fine clearance therebetween. In this condition, as shown in FIG. 15F, the optical reading system 412 reads the image information on each original $S_4$, $S_3$ to form the images on the photosensitive drum. The images formed on the photosensitive drum 413 are then transferred onto a recording sheet 412 and are fixed thereon.

When the reading is finished, the whole-surface belt 424 and the ejector rollers 427a are rotated in the direction shown by the arrow a in FIG. 14 to discharge the originals $S_4$, $S_3$ from the platen 411 onto the sheet discharge tray 428.

In the same manner as mentioned above, as shown in FIG. 15G, the originals $S_1$ and $S_2$ are rested on the platen 411 with a minute clearance therebetween, and the image information of each original $S_1$, $S_2$ is read by the optical reading system 412, thereby printing the images on the recording sheet 414. In this way, the image information of each original $S_1$, $S_2$, $S_3$, $S_4$, $S_5$ is sequentially printed on the recording sheets 414 from the first page, thus preventing a so-called white blank to obtain good one-sided copies.

Next, an example where images are printed on both surfaces of a recording sheet A will be explained with reference to FIGS. 14 and 16A to 16D.

An original stack S is set on the stacking tray 421 with imaged surfaces thereof turned upside. Now, it is assumed that five originals $S_1$, $S_2$, $S_3$, $S_4$ and $S_5$ each having a size of A4 and an image recorded on only one surface thereof are stacked onto the stacking tray 421. Then, when the one scan copy mode is selected by the mode selection switch (not shown) and the copy start switch (not shown) is depressed, the original feeding apparatus 420 is activated to create a count mode for counting the number of the originals.

This count mode is effected in the same manner as in the case where the image information is printed on one surface of the recording sheet (FIGS. 15A to 15G). In this count mode, the number $N_1$ of the originals is counted by counting the number of the original feeding cycles and the counted value $N_1$ is stored in the RAM 33 (FIG. 17) of the controlling portion 30. Further, during such counting operation, the size of the original is detected, and the detected size information is also stored in the RAM 33.

After the above-mentioned count mode is finished, as shown in FIG. 16A, the originals on the discharge tray 428 are again set on the stacking tray 421 as the same attitude as the previous one, and then the copy start switch (not shown) is depressed.

Now, it is assumed that each original has A4 size, the recording sheet has A3 size, the magnification 100% and the number $N_2$ of the originals to be simultaneously fed to the platen 411 is two. Further, since the number $N_1$ of the originals is five and the both-sided printing is effected, the controlling portion 30 seeks the residual $N_4$ by dividing $N_1$ by $(N_2 \times 2)$ (i.e., $N_4 = 1$; $5 \div (2 \times 2) = (2 \times 2) \times 1 + 1$).

When the residual $N_4 = 1$ is calculated, the copying operation in effected in a copying mode wherein at first only the original corresponding to the last page is fed to the platen so that the image thereon is printed on a single recording sheet 414 and thereafter four images of four originals ($N_2 \times 2 = 4$) are printed on a single same recording sheet. That is to say, in response to the re-start signal, the supply roller 421a and the separating portion 422 are rotated to separate the lowermost or fifth original $S_5$ from the original stack S and to feed it until the leading end of the original $S_5$ abuts against the feed rollers 423a to form a predetermined loop therein.

Then, the feed rollers 423a and the whole-surface belt 424 are rotated in the direction shown by the arrow a in FIG. 14 to feed the original $S_5$ toward the platen 411. After the trailing end of the original $S_5$ has passed through the sensor 423b, the original $S_5$ is moved until the trailing end of the original $S_5$ reaches a position spaced apart from the reading start position P on the platen 411 by a distance corresponding to the length of the original (length of A4 size).

In this condition (FIG. 16B), the optical reading system 412 reads the image information of the original $S_5$ to form the image information on the photosensitive drum. The image formed on the photosensitive drum is transferred onto the recording sheet 414 of A3 size and then the transferred image is fixed to the sheet.

When the reading is finished, the whole-surface belt 424 and the ejector rollers 427a are rotated in the direction shown by the arrow a in FIG. 14 to discharge the original $S_5$ from the platen 411 to the sheet discharge tray 428. Then, the supply roller 421a and the separating portion 422 are rotated again to separate the fourth original $S_4$ (now a lowermost original) and to feed it until the leading end of the original $S_4$ abuts against the feed rollers 423a to form a predetermined loop in the original.

Thereafter, the feed rollers 423a and the whole-surface belt 424 are rotated in the direction shown by the arrow a in FIG. 14 to feed the original $S_4$ toward the platen 411. The original $S_4$ is initially stopped when the trailing end of this original has passed through the feed rollers 423a.

Then, the whole-surface belt 424 is rotated in reverse in the direction shown by the arrow b in FIG. 14 until the trailing end of the original $S_4$ abuts against the feed rollers 423a. Thereafter, the third original $S_3$ is separated from the original stack and is fed until the trailing end of this original abuts against the feed rollers 423a to form a predetermined loop therein.

Then, the feed rollers 423a and the whole-surface belt 424 are again rotated in the direction a in FIG. 14 until the trailing end of the original $S_3$ has passed through the sensor 423b and reaches the reading start position P on the platen 411.

In this way, two originals $S_4$ and $S_3$ are rested on the platen 411 with a minute or fine clearance therebetween. In this condition, as shown in FIG. 16C, the optical reading system 412 reads the image information of each original $S_4$, $S_3$ to form the images on the photosensitive drum. The images formed on the photosensitive drum are then transferred onto one surface of a recording sheet 414 of A3 size and are fixed thereon. And, this recording sheet 414 is once stocked on the intermediate tray.

When the reading is finished, the whole-surface belt 424 and the ejector rollers 427a are rotated in the direction shown by the arrow a in FIG. 14 to discharge the originals $S_4$, $S_3$ from the platen 411 onto the sheet discharge tray 428.

In the same manner as mentioned above, the first and second originals $S_1$ and $S_2$ are positioned on the platen 411 with a minute clearance therebetween. And, as shown in FIG. 16D, the image information of each original $S_1$, $S_2$ is read by the optical reading system 412, thereby printing the images on the other surface of the recording sheet 414 stocked on the intermediate tray. Thereafter, the recording sheet is ejected. In this way, the image information of each original $S_1$, $S_2$, $S_3$, $S_4$, $S_5$ is sequentially printed on the recording sheets 414 from the first page, thus preventing the so-called white blank to obtain good both-sided copies.

Next, the controlling portion 30 acting as the control means for controlling the original feeding apparatus 20 as mentioned above will be explained with reference to FIG. 17.

The controlling portion 30 comprises a CPU 431 for controlling the whole original feeding apparatus 20, a ROM 432 for storing the controlling contents shown in FIG. 18 and other various data, a RAM 433 used as a work area for the CPU 431 and adapted to temporarily store various data such as the number of the originals, and an interface 434. The above-mentioned sensors 421b, 423b, 427b and the photo-interrupter 426 are connected to the CPU through the interface so that signals emitted from these elements 421b–426 are inputted to the CPU 431. Further, control signals from the CPU 431 can be supplied to the supply roller or sheet feed roller 421a, separating portion 422, feed rollers or conveying rollers 423a, driving motor 425 and sheet discharging rollers 427a through the interface.

When the copy start switch is depressed, the controlling portion 30 starts to perform the controlling operation in accordance with the controlling contents of the flow chart shown in FIG. 18. That is to say, in a step S10, it is judged whether the one scan mode or the normal copy mode is requested; if the normal copy mode is requested, the sequence goes to a step S11, where the printing is initiated in the normal copy sequence.

On the other hand, if the one scan copy mode is requested, the sequence goes to a step S12, where the count mode is executed. In this count mode, the number $N_1$ of the originals is counted and at the same time the size of the original is detected.

Then, the sequence goes to a step S13, where the number $N_2$ of the originals to be simultaneously set on the platen 411 is calculated on the basis of the size of the original, the size of the recording sheet, the magnification and the like. Then, in a step S14, it is judged whether the one-surface copy or the both-surface copy is requested; if one-surface copy (YES), the sequence goes to a step S15, where the residual $N_3$ is calculated by dividing the number $N_1$ of the originals by the number $N_2$ of the originals to be simultaneously set.

Then, in a step S16, $N_3$ (in number) originals from the last page are set on the platen 411, and the images of these originals are printed on a same single recording sheet 414. Then, in a step S17, the originals are treated by $N_2$ sheets and the images thereof are printed out on a same recording sheet 414. That is to say, $N_2$ (in number) originals are simultaneously set on the platen 411 and the images of these originals are printed on the same recording sheet 414.

Then, in a step S18, the treatments in the step S17 are repeated until the originals on the stacking tray 421 are exhausted. When there is no original on the stacking tray 421, the treatment is finished.

On the other hand, if it is judged that the both-surface copy is requested in the step S14, the sequence goes to a step S19, where the residual or rest $N_4$ is calculated by dividing tee number $N_1$ of the originals by a value ($N_2 \times 2$). Then, in a step S20, $N_4$ (in number) originals from the last page are set on the platen 411, and the images of these originals are printed on a same single recording sheet 414.

Then, in a step S21, the originals are treated by $N_2$ sheets and the images thereof are printed out on a same recording sheet 414. That is to say, first $N_2$ (in number) originals are simultaneously set on the platen 411 and the images of these originals are printed on a same recording sheet 414, and then the remaining $N_2$ (in number) originals are simultaneously set on the platen 411 and the images of these originals are printed on a same recording sheet 414.

Then, in a step S22, the treatments in the step S21 are repeated until the originals on the stacking tray 421 are exhausted. When there is no original on the stacking tray 421, the treatment is finished.

In the illustrated embodiment (FIGS. 14–18), while the original was fed from the last page to the platen 411, alternatively, the original may be fed from the first page to the platen 411.

Figure 19:
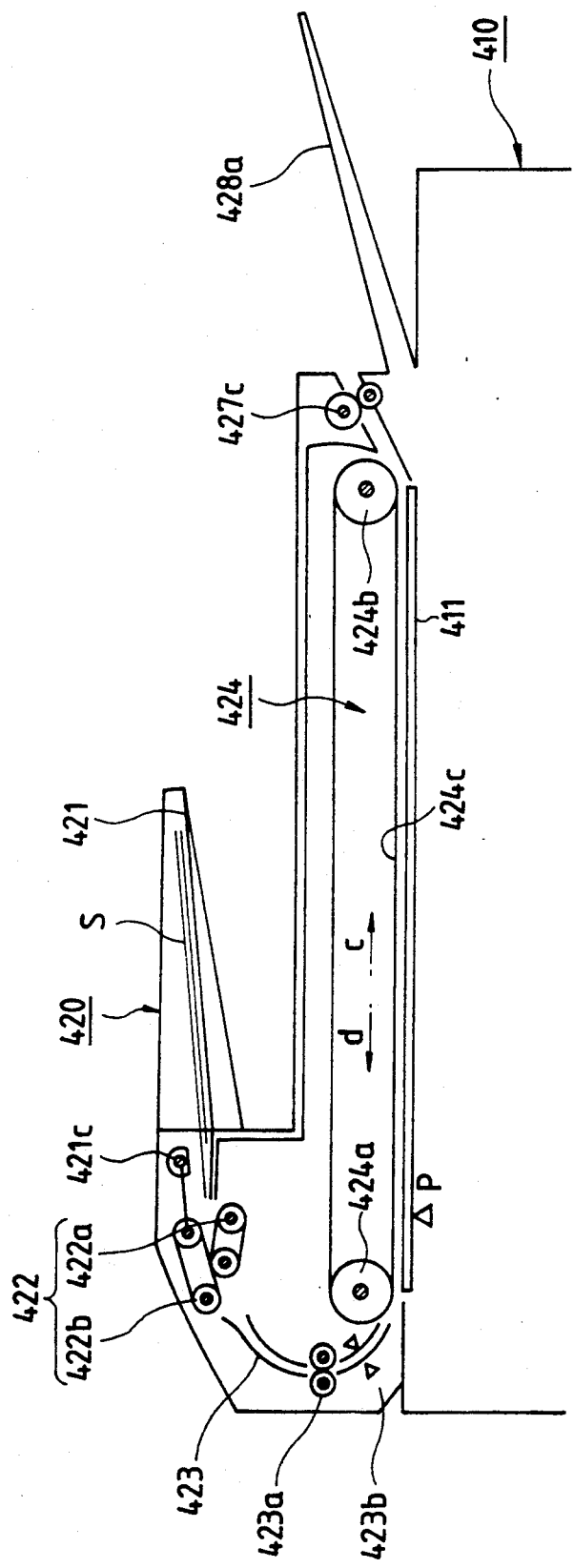
FIG. 19 is an elevational view of the original feeding apparatus in an alterative form.

FIG. 19 schematically shows an original feeding apparatus 420 for carrying out the above alteration. In the original feeding apparatus 420, at a downstream side of the stacking tray 421, there is arranged a semicircular sheet supply roller 421c for separating an uppermost original from the original stack S on the stacking tray 421. Further, a sheet discharge tray 428a is disposed to extend rightwardly and upwardly from the other end of the platen 411, rather than being disposed above the conveying belt 424c. In addition, sheet discharging rollers 427c are disposed between the other end of the platen 411 and the sheet discharge tray 428a. These points are different from those of the original feeding apparatus 420 of FIG. 14, and other construction is the same as that of the apparatus of FIG. 14.

Incidentally, the constructional elements shown in FIG. 19 as same as those shown in FIG. 14 are designated by the same reference numerals and the explanation thereof will be omitted.

Next, an example that the originals are fed to the platen 411 sequentially from the first page by means of the original feeding apparatus 420 and the images of the originals are printed on one surface of the respective recording sheets will be explained with reference to FIGS. 20A to 20F.

First of all, an original stack S is set on the stacking tray 421 with imaged surfaces thereof turned upside. Now, it is assumed that five originals $S_1$, $S_2$, $S_3$, $S_4$ and $S_5$ each having a size of A4 and an image recorded on only one surface thereof are stacked onto the stacking tray 421. Then, when the one scan copy mode is selected by the mode selection switch (not shown) and the copy start switch (not shown) is depressed, the original feeding apparatus 420 is activated to create a count mode for counting the number of the originals.

In this count mode, the supply roller 421c and the separating portion 422 are driven to separate an uppermost or first original $S_1$ from the original stack on the stacking tray 421 and feed it to the feed rollers 423a until a leading end of the first original $S_1$ abuts against the feed rollers 423a to form a loop in the original.

Then, the feed rollers 423a and the whole-surface belt 424 are rotated in the direction shown by the arrow c (FIG. 19) to feed the original $S_1$ toward the platen 411. When a predetermined clock is advanced after the trailing end of the original $S_1$ has passed through the sensor 423b (i.e., the trailing end of the original $S_1$ reaches near a P shown in FIG. 19), the original is temporarily stopped.

Then, the supply roller 421c and the separating portion 422 are driven to separate and feed a next or second original $S_2$ until a leading end of this original abuts against the feed rollers 423a to form a predetermined loop in this original. Thereafter, the feed rollers 423a and the whole-surface belt 424 are rotated in the direction shown by the arrow c (FIG. 19) to further move the first original $S_1$ from near the reading start position P to the right by a distance corresponding to the size of the original (the length of the A4 size original) and to feed the second original $S_2$ near the reading start position P, thereby resting two originals $S_1$, $S_2$ adjacent to each other.

Then, in the same manner as the above, a third original $S_3$ is separated and fed until a leading end of the original abuts against the feed rollers 423a to form a predetermined loop in this original. Thereafter, the feed rollers 423a, whole-surface belt 424 and ejector rollers 427c are rotated in the direction shown by the arrow c (FIG. 19) to eject the first original $S_1$ onto the sheet discharge tray 428a, to move the second original $S_2$ to a position where the first original $S_1$ was positioned, and to move the third original $S_3$ near the reading start position P; and then these elements 423a–427c are stopped.

The above-mentioned cycles are repeated until all of the originals on the stacking tray 421 are ejected on the sheet discharge tray 428a.

By counting the above cycles, the number $N_1$ of the originals can be counted, and the counted value $N_1$ is stored in a RAM 33 (FIG. 17) of the controlling portion 430. Further, during such counting operation, the size of the original is detected, and the detected size information is also stored in the RAM 33.

Figure 20A:
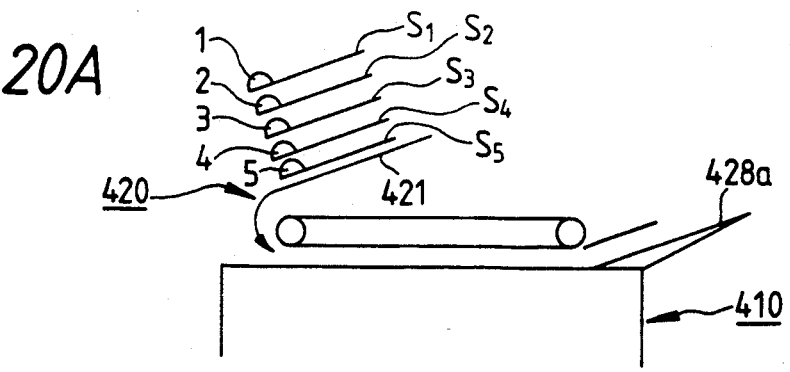
FIGS. 20A to 20E are schematic elevational views of the original feeding apparatus of FIG. 19, for explaining the operation thereof, where images are printed on a single surface of a recording medium.

After the above-mentioned count mode is finished, as shown in FIG. 20A, the originals on the discharge tray 428a are again set on the stacking tray 421 as the same attitude as the previous one, and then the copy start switch (not shown) is depressed.

Now, it is assumed that each original has A4 size, the recording sheet has A3 size, the magnification is 100% and the number $N_2$ of the originals to be simultaneously to the platen 411 is two. Further, since the number $N_1$ of the originals is five and the one-surface printing is effected, the controlling portion 30 seeks the rest or residual $N_3$ by dividing $N_1$ by $N_2$ i.e., $N_3=1$; $5 \div 2 = 2 \times 2 + 1$).

When the rest $N_3 = 1$ is calculated, the copying operation is effected in a mode wherein the originals are printed by two sheets ($N_2 = 2$) on a same recording sheet 414 and thereafter the image of the original $S_5$ corresponding to the last page is printed on a single recording sheet 414. That is to say, in response to the re-start signal, the supply roller 421c and the separating portion 422 are rotated to separate the uppermost or first original $S_1$ from the original stack S and to feed it until the leading end of the original $S_1$ abuts against feed rollers 423a to form a predetermined loop therein.

Then, the feed rollers 423a and the whole-surface belt 424 are rotated in the direction shown by the arrow c in FIG. 19 to feed the original $S_1$ toward the platen 411.

After a trailing end of the original $S_1$ has passed through the sensor 423b, this original is once stopped.

Then, the whole-surface belt 424 is rotated reversely in the direction shown by the arrow d in FIG. 19 to abut the trailing end of the original $S_1$ against the feed rollers 423a, and then the belt is stopped. Then, the second original $S_2$ is separated and is fed until the trailing end thereof abuts against the feed rollers 423a to form a predetermined loop therein.

Then, the feed rollers 423a and the whole-surface belt 424 are rotated again in the direction c in FIG. 19 to feed the originals until the trailing end of the second original $S_2$ has passed through the sensor 423b and reaches the position P, and then the feed rollers and the belt are stopped.

Figure 20B:
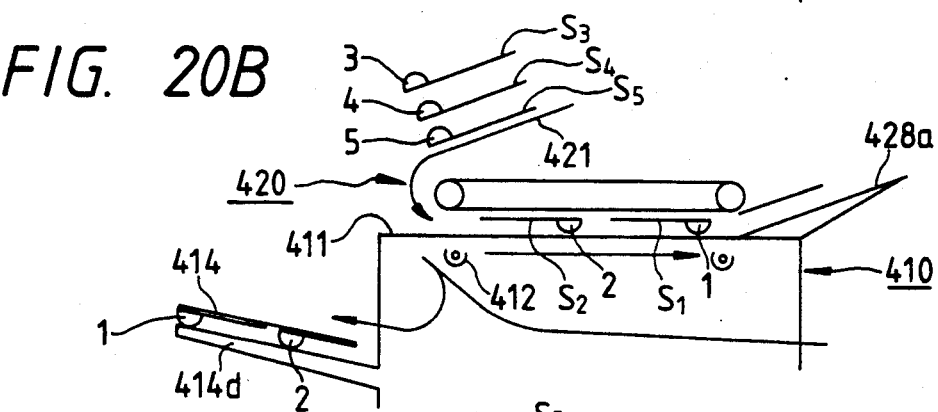
Figure 20C:
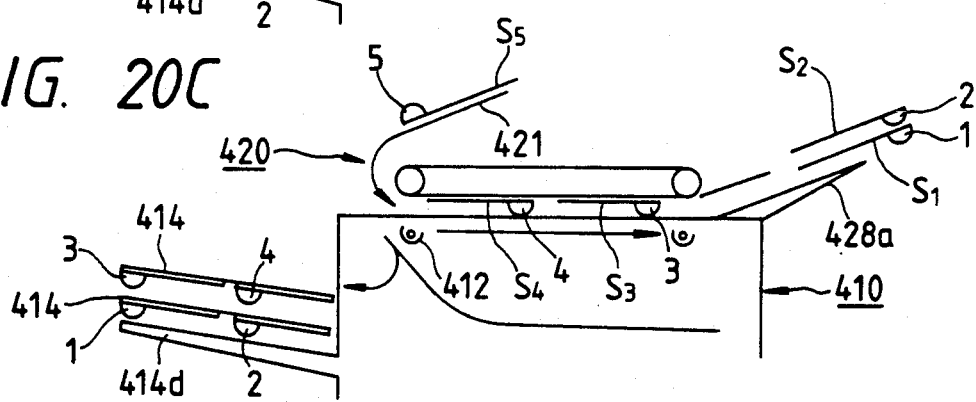

In this way, two originals $S_1$ and $S_2$ are positioned on the platen 411 with a minute clearance therebetween (the clearance between two originals can be further reduced by utilizing the method described in FIGS. 4 to 8). In this condition, as shown in FIG. 20B, the optical reading system 412 reads the image information of each original $S_1$, $S_2$ to form the images on the photosensitive drum. The images formed on the photosensitive drum are transferred onto the recording sheet 414 and then the transferred images are fixed to the sheet.

When the reading is finished, the whole-surface belt 424 and the ejector rollers 427c are rotated in the direction shown by the arrow c in FIG. 19 to discharge the originals $S_1$, $S_2$ from the platen 411 to the sheet discharge tray 428a.

In the same manner as mentioned above, as shown in FIG. 20C, the third and fourth originals $S_3$, $S_4$ are placed on the platen 411 with a minute clearance therebetween, and the optical reading system 412 reads the image information of each originals $S_3$, $S_4$ to print the images on a recording sheet 414.

Then, the supply roller 421c and the separating portion 422 are rotated to separated the final or fifth original $S_5$ and to feed it until the trailing end of the original abuts against the feed rollers 423a to form a predetermined loop therein. Then, the feed rollers 423a and the whole-surface belt 424 are rotated in the direction shown by the arrow c in FIG. 19 until the trailing end of the fifth original $S_5$ has passed through the sensor 423b and reaches a position spaced apart from the position P on the platen 411 toward a downstream side by a distance corresponding to the length of the original (length of A4 size).

Figure 20D:
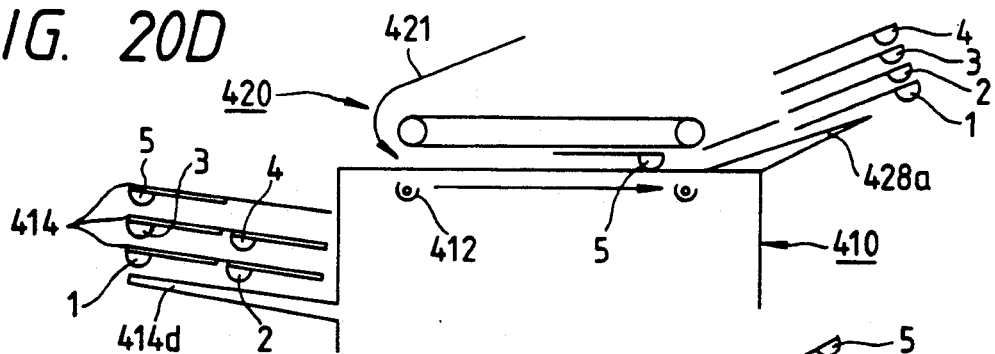

In this condition, as shown in FIG. 20D, the optical reading system 412 reads the image information of the original $S_5$ to form the image information on the photosensitive drum. The image formed on the photosensitive drum is transferred onto the recording sheet 414 and then the transferred image is fixed to the sheet.

Figure 20E:
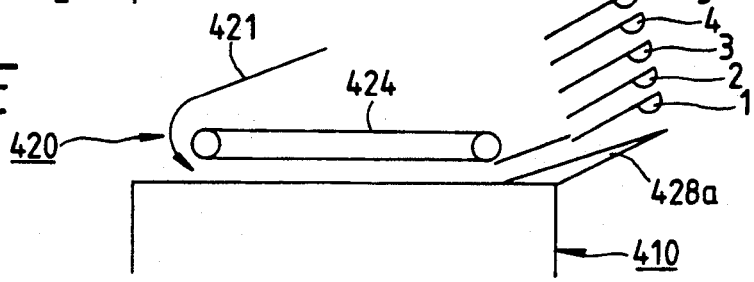

When the printing is finished, as shown in FIG. 20E, the whole-surface belt 424 and the ejector rollers 427c are rotated to discharge the original $S_5$ from the platen 411 to the sheet discharge tray 428a. In this way, the images of the originals $S_1$, $S_2$, $S_3$, $S_4$ and $S_5$ are sequentially recorded on the recording sheets A from the first page, thus preventing the so-called white blank to obtain good one-surface copies.

Next, an example that the originals are fed to the platen 411 sequentially from the first page by means of the original feeding apparatus 420 and the images of the originals are printed on both surfaces of the respective recording sheets will be explained with reference to FIGS. 21A to 21D.

First of all, an original stack S is set on the stacking tray 421 with imaged surfaces thereof turned upside. Now, it is assumed that five originals $S_1$, $S_2$, $S_3$, $S_4$, and $S_5$ each having a size of A4 and an image recorded on only one surface thereof are stacked onto the stacking tray 421. Then, when the one scan copy mode is selected by the mode selection switch (not shown) and the copy start switch (not shown) is depressed, the original feeding apparatus 420 is activated to create a count mode for counting the number of the originals. This count mode is effected in the same manner as in the case where the image information is printed on one surface of the recording sheet 414 (FIGS. 20A to 20E).

In this count mode, the number $N_1$ of the originals is counted by counting the number of the original feeding cycles and the counted value $N_1$ is stored in the RAM 433 (FIG. 17) of the controlling portion 430. Further, during such counting operation, the size of the original is detected, and the detected size information is also stored in the RAM 433.

Figure 21A:
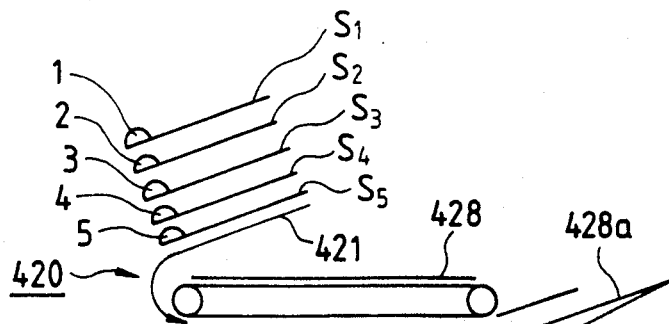
FIGS. 21A to 21D are schematic elevational views of the original feeding apparatus of FIG. 19, for explaining the operation thereof, where images are printed on both surfaces of a recording medium.

After the above-mentioned count mode is finished, as shown in FIG. 21A, the originals on the discharge tray 428a are again set on the stacking tray 421 as the same attitude as the previous one, and then the copy start switch (not shown) is depressed.

Now, it is assumed that each original has A4 size, the recording sheet has A3 size, the magnification is 100% and the number $N_2$ of the originals to be simultaneously fed to the platen 411 is two. Further, since the number $N_1$ of the originals is five and the both-surface printing is effected, the controlling portion 430 seeks the residual $N_4$ by dividing $N_1$ by $(N_2 \times 2)$ (i.e., $N_4 = 1$; $5 \div (2 \times 2) = (2 \times 2) \times 1 + 1$).

When the residual $N_4 = 1$ is calculated, the copying operation is effected in a mode wherein at first four images of four originals ($N_2 \times 2 = 4$) are printed on a single same recording sheet and thereafter the last original corresponding to the last page is fed to the platen so that the image thereon is printed on a single recording sheet 414. That is to say, in response to the re-start signal, the supply roller 421c and the separating portion 422 are rotated to separate the uppermost or first original $S_1$ from the original stack S and to feed it until the leading end of the original $S_1$ abuts against the feed rollers 423a to form a predetermined loop therein.

Then, the feed rollers 423a and the whole-surface belt 424 are rotated in the direction shown by the arrow c in FIG. 19 to feed the original $S_1$ toward the platen 411. After the trailing end of the original $S_1$ has passed through the sensor 423b and a predetermined clock has been advanced, the original $S_1$ is once stopped (near the position P in FIG. 19).

Then, the whole-surface belt 424 is rotated reversely in the direction shown by the arrow d in FIG. 19 to abut the trailing end of the original $S_1$, and then the belt is stopped.

Then, the second original $S_2$ is separated and is fed until the trailing end of this original abuts against the feed rollers 423a to form a predetermined loop therein. Thereafter, the feed rollers 423a and the whole-surface belt 424 are rotated again in the direction shown by the arrow c in FIG. 19 until the trailing end of the second original $S_2$ has passed through the sensor 423b and reaches the position P on the platen 411, and then the rollers 423a and the belt 424 are stopped.

Figure 21B:
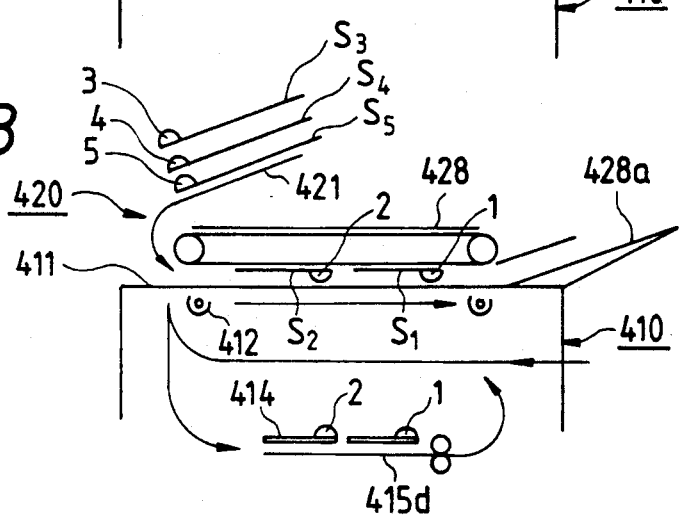
Figure 21C:
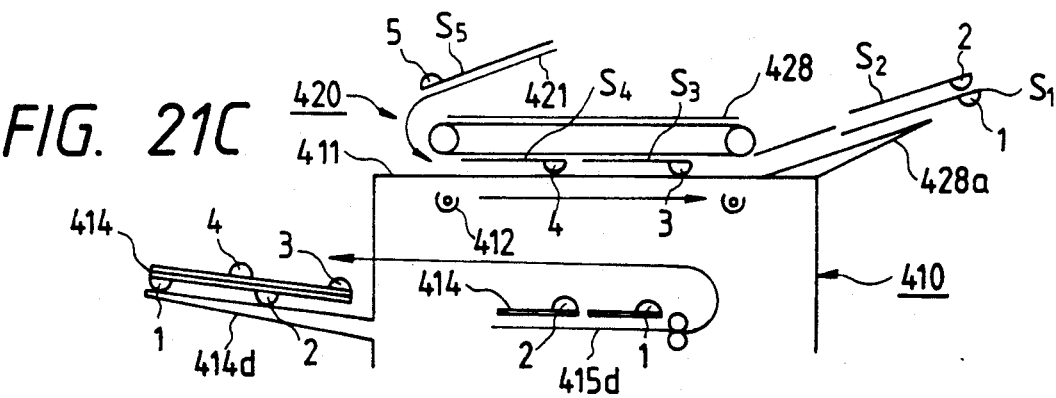

In this way, two originals $S_1$ and $S_2$ are placed side by side on the platen 411 with a minute clearance therebetween. In this condition, as shown in FIG. 21B, the optical reading system 412 reads the image information of each original $S_1$, $S_2$ to form the images on the photosensitive drum. The images formed on the photosensitive drum are then transferred onto one surface of a recording sheet 414 and are fixed thereon. And, this recording sheet 414 is once stocked on the intermediate tray.

When the reading is finished, the whole-surface belt 424 and the ejector rollers 427c are rotated in the direction shown by the arrow c in FIG. 19 to discharge the originals $S_1$, $S_2$ from the platen 411 onto the sheet discharge tray 428a.

In the same manner as mentioned above, as shown in FIG. 21C, the third and fourth originals $S_3$, $S_4$ are rested on the platen 411 a minute clearance therebetween. The image information of each original $S_3$, $S_4$ is read by the optical reading system 412, thereby printing the images on the other surface of the recording sheet 14 conveyed from the intermediate tray to the photosensitive drum.

Thereafter, the recording sheet 414 having one surface on which the images of the originals $S_1$, $S_2$ were printed and the other surface on which the images of the originals $S_3$, $S_4$ were printed is ejected onto a tray 414d. Then, the supply roller 421c and the separating portion 422 are rotated to separate the last or fifth original $S_5$ and to feed it until the leading end of this original abuts against the feed rollers 423a to form a predetermined loop therein.

Then, the feed rollers 423a and the whole-surface belt 424 are rotated in the direction shown by the arrow c in FIG. 19 until the trailing end of the original $S_5$ has passed through the sensor 423b and reached a position spaced apart from the position P on the platen 411 toward a downstream side by a distance corresponding to the length of the original (length of A4 size), and then the original $S_5$ is stopped.

Figure 21D:
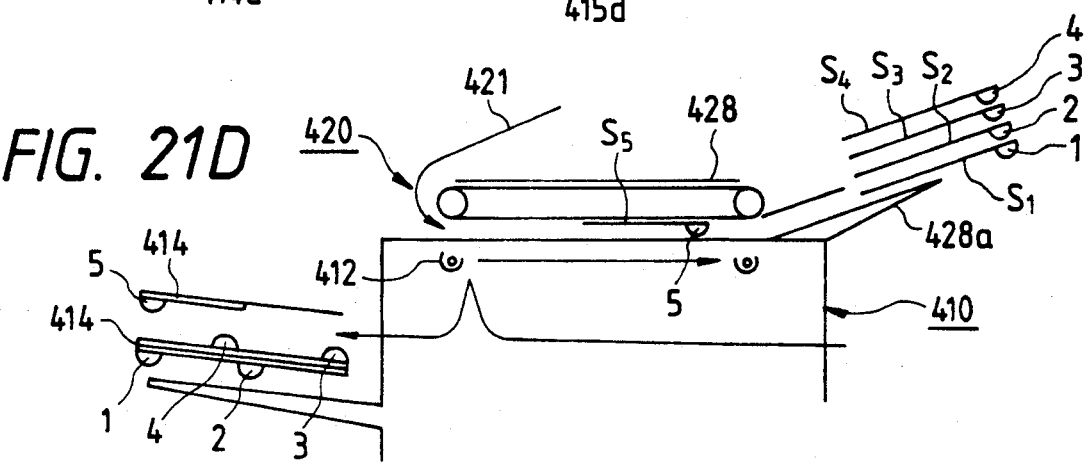
Figure 22:
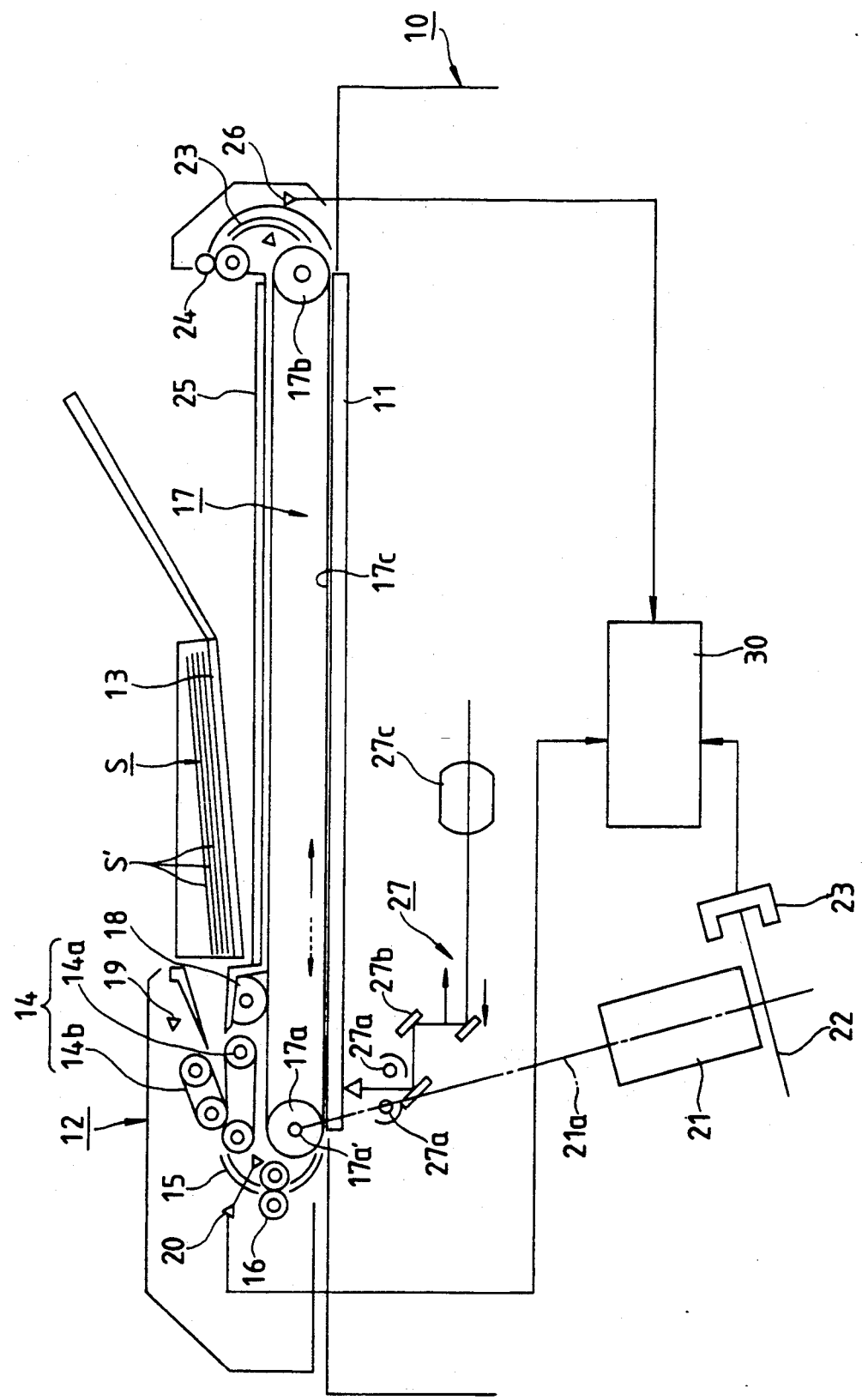
FIG. 22 is a schematic sectional view of an original feeding apparatus of an image forming system, according to a further embodiment of the present invention.

In this condition, as shown in FIG. 21D, the optical reading system 412 reads the image information of the original $S_5$ to form the image information on the photosensitive drum. The image formed on the photosensitive drum is transferred onto the recording sheet 414 and then the transferred image is fixed to the sheet.

When the printing is finished, the whole-surface belt 424 and the ejector rollers 427c are rotated to discharge the original $S_5$ from the platen 411 to the sheet discharge tray 428a. In this way, the images of the originals $S_1$, $S_2$, $S_3$, $S_4$ and $S_5$ are sequentially recorded on the recording sheets A from the first page, thus preventing the so-called white blank to obtain good both-surface copies.

In the above-mentioned first and second alterations (FIGS. 14 to 21), while an example that the number of the originals is counted at the count mode and the original size is detected during the count mode was explained, the present invention is not limited to such example, but such data may be inputted from an operating portion of the copying machine 410.

Further, while an example that two originals are simultaneously fed to the platen 411 ($N_2 = 2$) was explained, three, four or more originals may be simultaneously fed to the platen if the size of the original is smaller and the size of the recording sheet is larger. Further, while an example that the magnification is 100% was explained, variable magnifications may be adopted.

In addition, while an example that the separate or discrete stacking tray 421 and sheet discharge trays 428a are provided was explained, the present invention is not limited to this example, but a circulating original feeding apparatus (RDF type) wherein the original is separated from the bottom of the original stack on the stacking tray and is returned onto the same original stack from an upper side may be adopted.

By using this original feeding apparatus of RDF type, there is no need for the originals to be set again after the count mode. Further, while an example that, in feeding the remaining original to the platen, for example in the case shown in FIGS. 15A to 15G, the original $S_5$ is conveyed up to the position spaced apart from the position P on the platen 411 toward the downstream side by the distance corresponding to the length of the original (A4) was explained, the original may be stopped at the position P.

Further, while the present invention was applied to the copying machine, it may be applied to a laser beam printer, image reader or the like.

Next, a further embodiment wherein the minute clearance between the originals is further minimized or eliminated will be explained with reference to FIGS. 22 to 27.

Since the construction of the copying machine according to this embodiment is the same as those shown in FIGS. 4, 9 and 14, the detailed explanation thereof will be omitted.

Figure 23A:
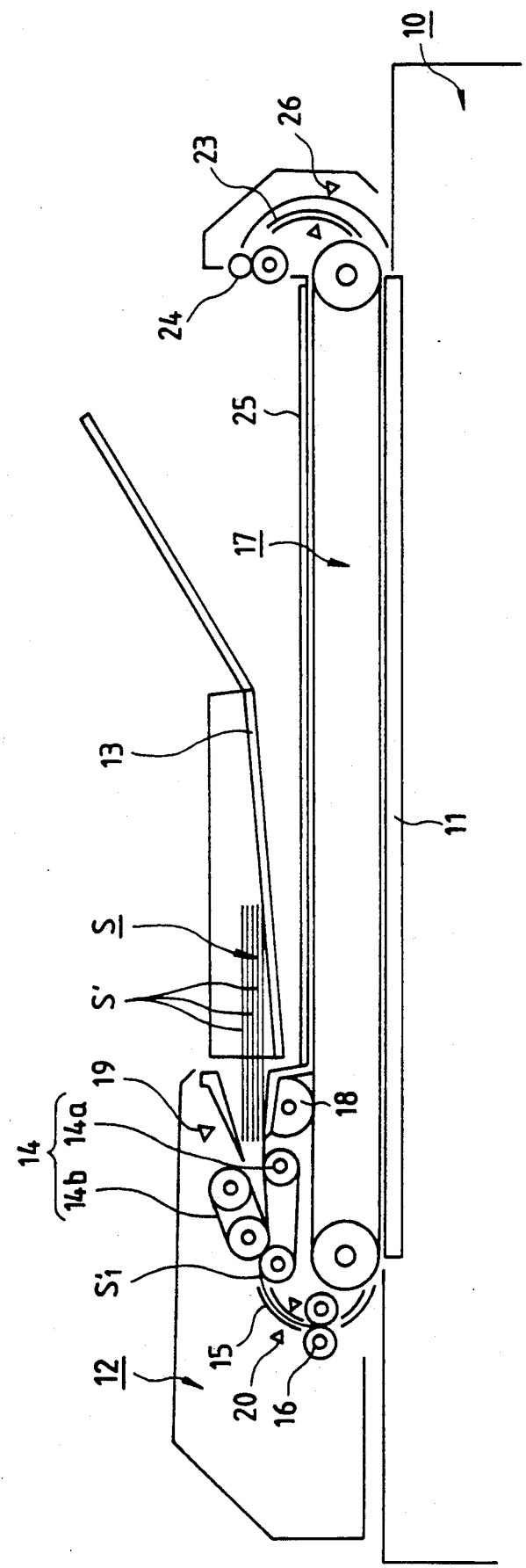
Figure 23B:
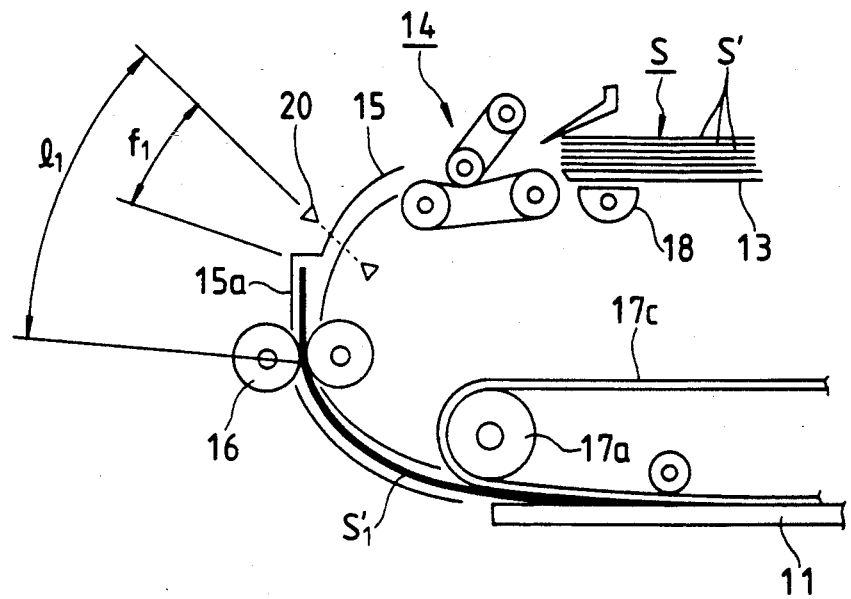
Figure 23C:
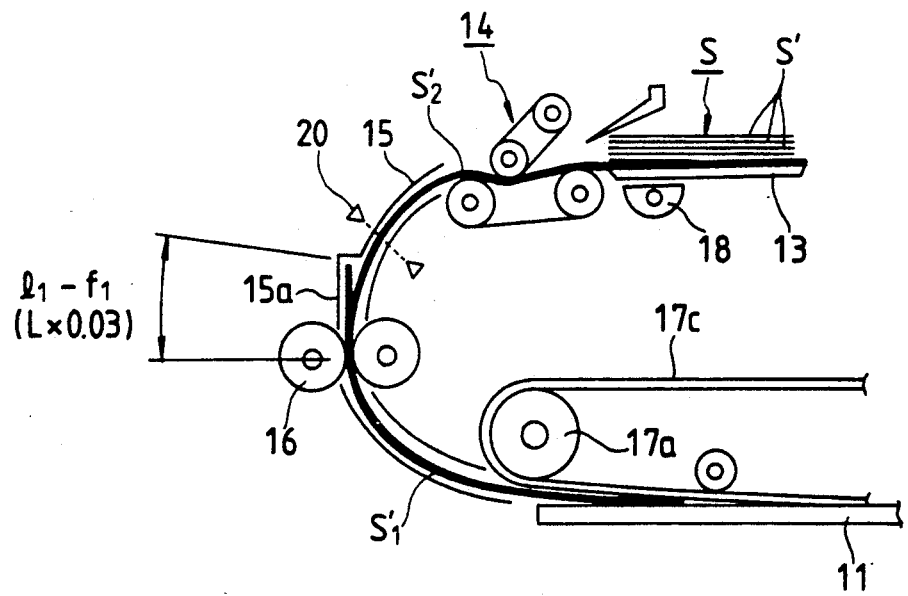

In the vicinity of the feed rollers 16 disposed along the guide 15, there is provided a waiting portion 15a swelling outwardly (refer to FIGS. 23B, 23C). The waiting portion 15a so acts that, when a trailing end of the first original $S_1'$ is overlapped with a leading end of the second original $S_2'$, the trailing end portion of the first original $S_1'$ is temporarily received in the waiting portion and the leading end of the second original $S_2'$ can be fed until it abuts against the feed rollers 16 without being obstructed by the trailing end of the first original $S_1'$. Further, a sensor 20 for detecting the passage of the original S' is arranged at an appropriate position along the guide 15.

The moving speed of the whole-surface belt 17c is selected to be slightly faster than the rotating speed of the feed rollers 16. In general, the former is faster than the latter by about 3%. The reason for adopting this speed difference is that, if the speed of the feed rollers 16 is faster than the whole-surface belt 17c, the original S' slackens between the feed rollers 16 and the whole-surface belt 17c, thus affecting a bad influence upon the feeding of the original.

The controlling portion 30 to which the sensors 20, 26 and the photo-interrupter 23 are connected receives signals from these elements 20, 26, 23 and controls the original feeding apparatus 12 in such a manner that the trailing end of the first original $S_1'$ and the leading end of the second original $S_2'$ are once overlapped with each other in the waiting portion 15a and these two originals are fed to the platen 11 meanwhile the overlapped amount is reduced to substantially zero.

Further, the controlling portion 30 calculates the overlapped amount (between the originals) on the basis of the length of the original S' (in the feeding direction) detected by the sensor 20 and the photo-interrupter 23, and controls the original feeding apparatus 12 as mentioned above, on the basis of this overlapped amount. Further, to the controlling portion 30, a mode switch 31 for setting a copy mode and a copy sheet size switch 32 for setting a size of the copy sheet are connected; these switches are arranged on the operation panel (not shown) of the copying machine 10.

Next, an operation of this copying machine will be explained with reference to FIGS. 23A to 23F and 25.

First of all, in a step S10, an original stack S is set on the stacking tray 13 with imaged surfaces thereof turned upside (FIG. 23A). Then, in a step S11, the one scan mode (wherein images of a plurality of originals S' are printed on one surface of a copy sheet) is set by the mode switch 31, and the size of the copy sheet is set by the copy sheet size switch 32. Further, the magnification is also set. In this embodiment, it is assumed that the size of the original is A4, the size of the copy sheet is A3 and the magnification is 100%.

Then, when the copy start button (not shown) is depressed, in a step S12, it is judged whether the copy start button is turned ON or OFF; if it is turned ON, the sequence goes to a step S13, where the separating portion 14 and the supply roller 18 are rotated to separate a first original $S_1'$ from a bottom of the original stack S and to feed it until the leading end of this original abuts against the feed rollers 16 to form a predetermined loop therein (FIG. 23A).

In a step S14, it is judged whether the leading end of the first original $S_1'$ is abutted against the feed rollers 16 or not; if abutted, the sequence goes to a step S15 and at the same time the separating portion 14 and the supply roller 18 are stopped. In the step S15, the feed rollers 16 and the whole-surface belt 17 are rotated normally to feed the first original $S_1'$ toward the platen 11. Then, in a step S16, the size of the first original $S_1'$ being passed through the sensor 20 is detected by the photo-interrupter 23 and the sensor 20, and the overlapped amount is calculated on the basis of the detected data. And, it is judged whether the trailing end of the first original $S_1'$ is advanced by a predetermined amount $f_1$ after it has passed through the sensor 20.

If the trailing end of the first original $S_1'$ is advanced by the predetermined amount $f_1$ (YES), the sequence goes to a step S17, where the feed rollers 16 and the whole-surface belt 17 are temporarily stopped (FIG. 23B). Now, as shown in FIG. 23B, when a distance between the sensor 20 and the nip of the feed rollers 16 is $l_1$, the trailing end of the first original $S_1'$ is stopped to protrude from the nip of the feed rollers 16 toward an upstream side by an amount $(l_1 - f_1)$.

Then, in a step S18, the separating portion 14 and the supply roller 18 are rotated to separate the second original $S_2'$, and in a step S19, the leading end of the second original $S_2'$ is abutted against the feed rollers 16 to form a predetermined loop therein (FIG. 23C). In the step S19 if the leading end of the second original $S_2'$ is abutted against the feed rollers 16, the sequence goes to a step S20 and at the same time the separating portion 14 and the supply roller 18 are stopped.

When the leading end of the second original $S_2'$ is being fed to the feed rollers 15, since the protruding trailing end of the first original $S_1'$ is received in the outwardly swelling waiting portion 15a due to the elastic feature of the original itself and does not block the passage in the guide 15, leading end of the second original $S_2'$ can move in the guide 15 and abut against the feed rollers 16 without any obstruction.

In this way, the trailing end portion of the first original $S_1'$ and the leading end portion of the second original $S_2'$ are overlapped with each other by the predetermined amount $(l_2-f_1)$. In the step S20, the feed rollers 16 and the whole-surface belt 17 are rotated normally to feed the first and second originals $S_1'$, $S_2'$ toward the platen 11.

Figure 23D:
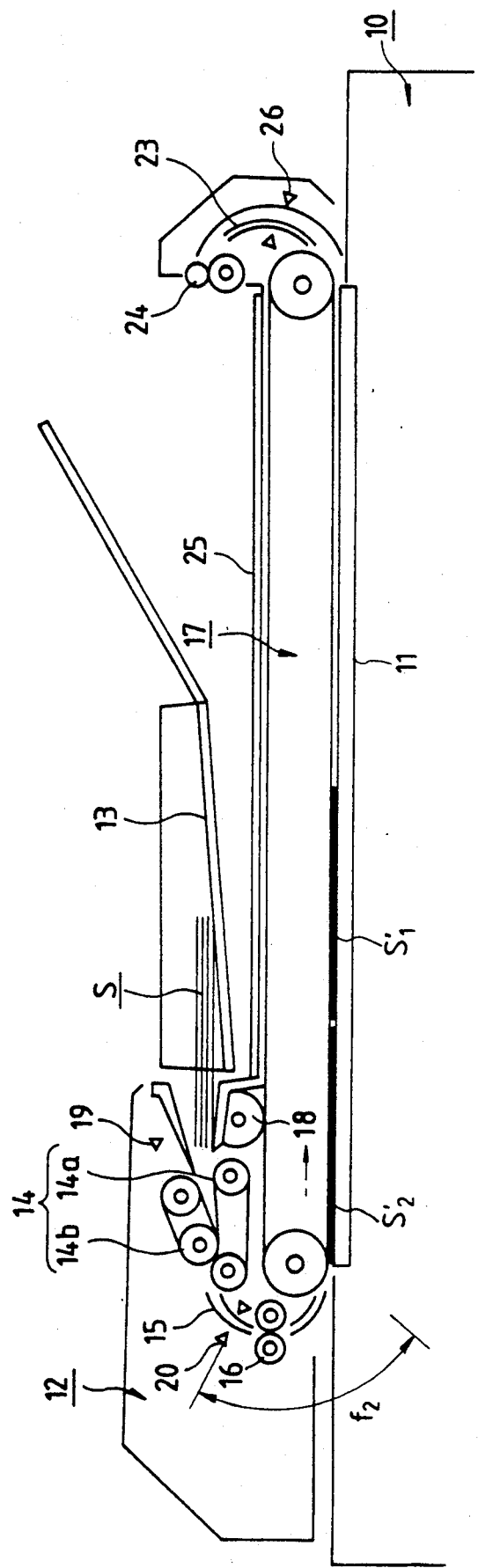
Figure 24:
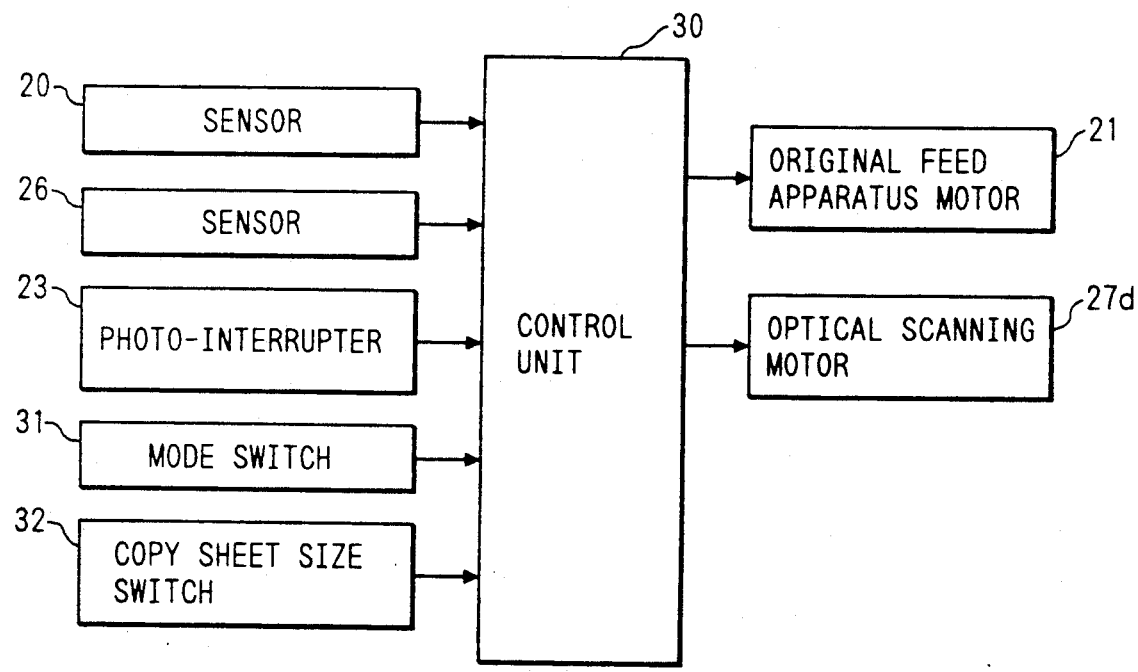
FIG. 24 is a block diagram of a control system of the image forming system.
Figure 25A:
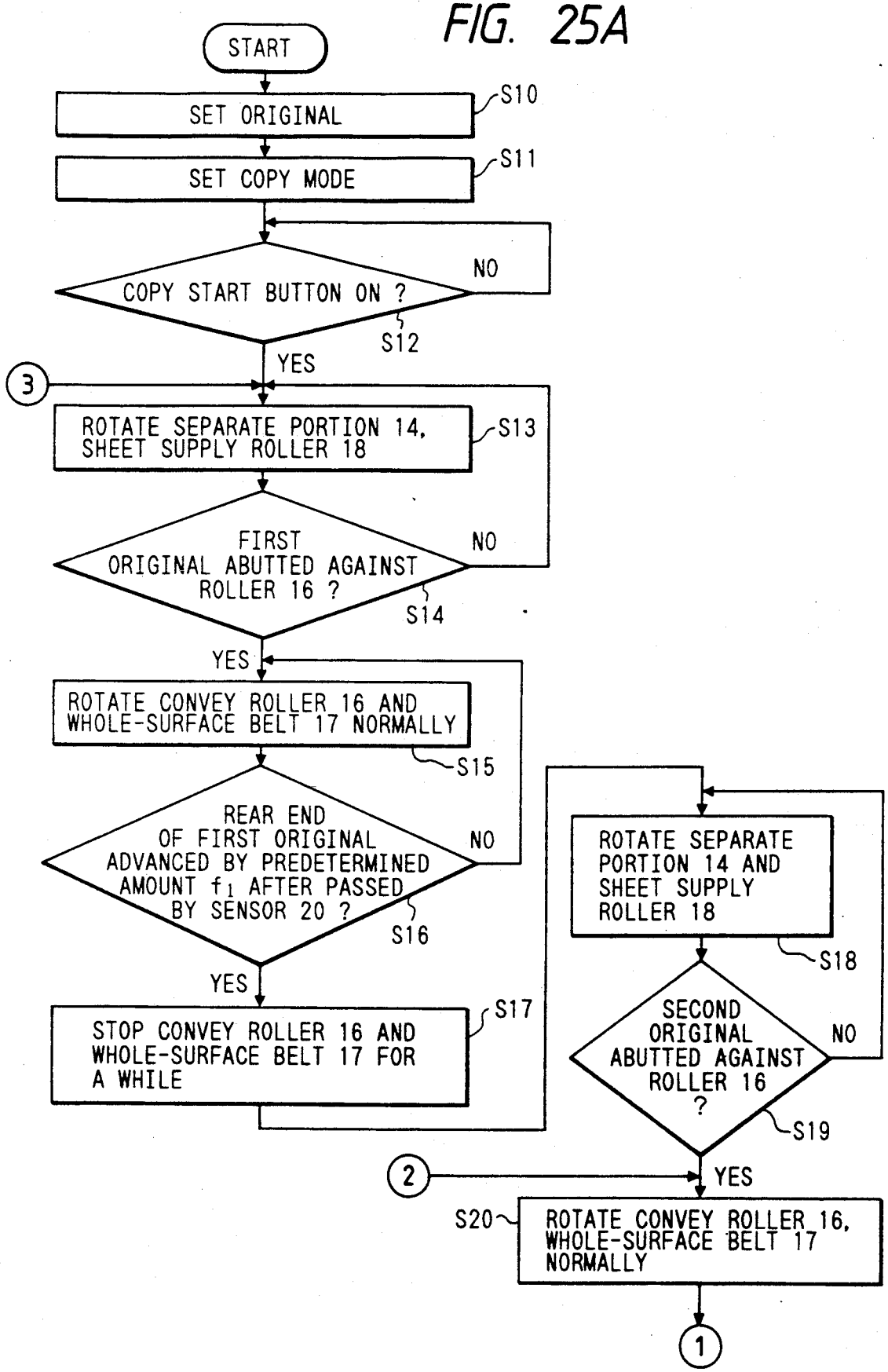
FIGS. 25A and 25B are a flow chart showing the controlling contents of the control system.
Figure 25B:
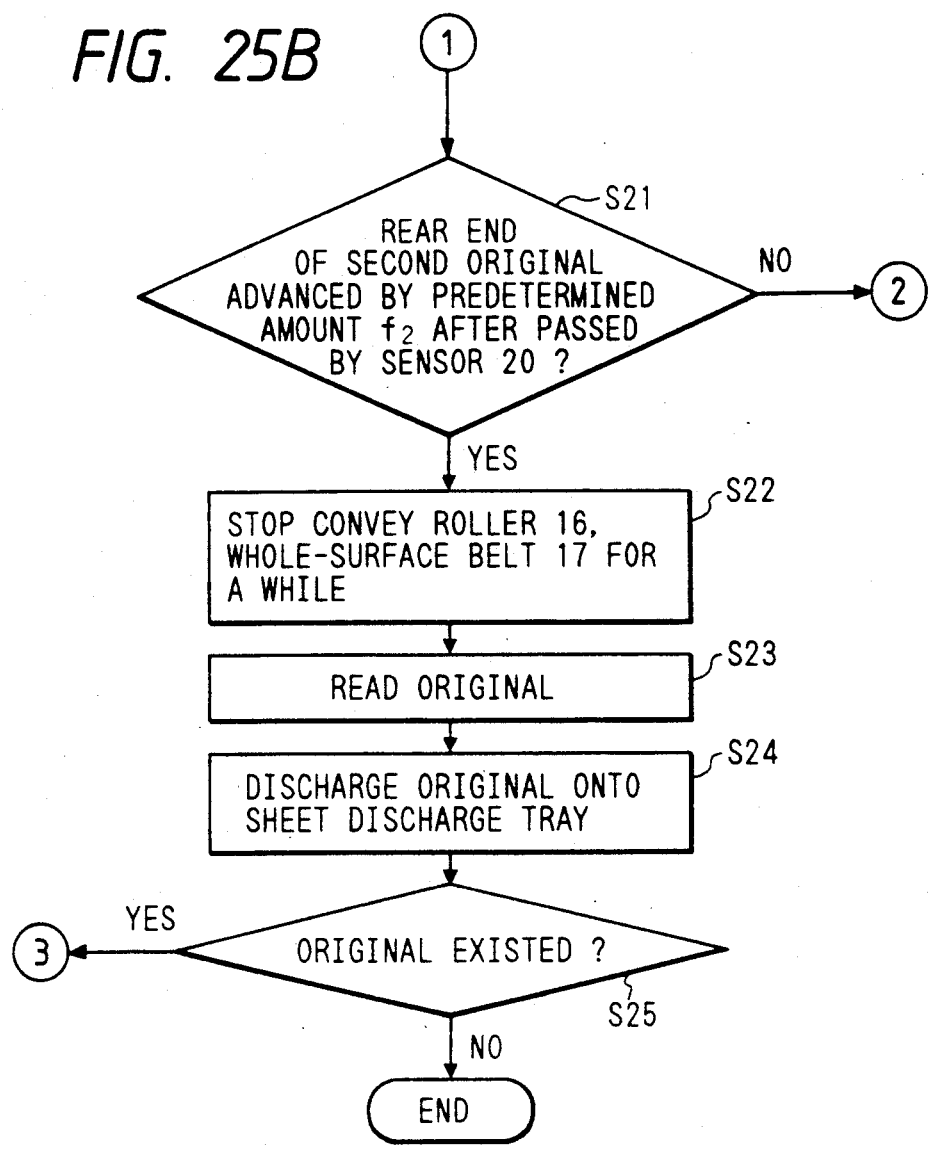

Then, in a step S21, it is judged whether the trailing end of the second original $S_2'$ is advanced by a predetermined amount $f_2$ after it has passed through the sensor 20, that is to say, it is judged whether the trailing end of the second original $S_2'$ is advanced until it reaches the platen 11 as shown in FIG. 23D. If advanced (YES), the sequence goes to a step S22, where the feed rollers (convey rollers) 16 and the whole-surface belt 17 are stopped.

Now, the first and second originals $S_1'$ and $S_2'$ are moved at a speed same as the rotating speed of the feed rollers 16 while these originals are being pinched by the nip between the feed rollers; whereas, after the original has left the feed rollers, the original is moved at a speed same as the moving speed of the whole-surface belt 17 (faster than the speed of the feed rollers 16 by about 3%).

Accordingly, the first original $S_1'$ is moved together with the second original $S_2'$ by a distance corresponding to the overlapped amount $(l_1-f_1)$, and thereafter, the first original $S_1'$ is moved at the speed faster than that of the second original $S_2'$ by means of the whole-surface belt 17, with the result that, during the originals are being fed to the platen 11 the overlapped amount is gradually reduced, and when the trailing end of second original reaches the platen 11, the first and second originals $S_1'$ and $S_2'$ are placed side by side on the platen 11 without substantially no clearance therebetween.

Then, in a step S23, the image information of the first original $S_1'$ and the image information of the second original $S_2'$ are read, and the read images are printed out on one surface of the copy sheet of A3 size (FIG. 23E). After the reading is finished, in a step S24, the whole-surface belt 17 and the ejector rollers 24 are rotated normally to discharge the first and second originals $S_1'$, $S_2'$ from the platen 11 onto the discharge tray 25 (FIG. 23F).

Then, in a step S25, it is judged whether any originals remain on the stacking tray 13; if remain (YES), the sequence returns to the step S13, and the same cycles are repeated until there is no original $S'$ on the stacking tray.

Figure 26:
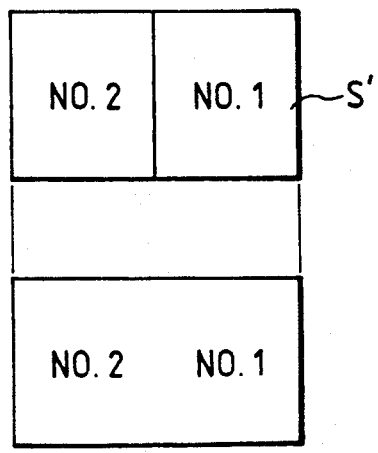
FIG. 26 is a plan view of images printed on a recording medium by the original feeding apparatus of FIG. 22.

In this way, the images of two originals $S'$ of A4 size can be printed on one surface of the copy sheet of A3 size without the lack or disappearance of the images, as shown in FIG. 26.

Next, a process wherein the overlapped amount between the first and second originals are reduced to substantially zero during the feeding of the originals will be fully explained with reference to FIG. 27A to 27D.

Figure 27A:
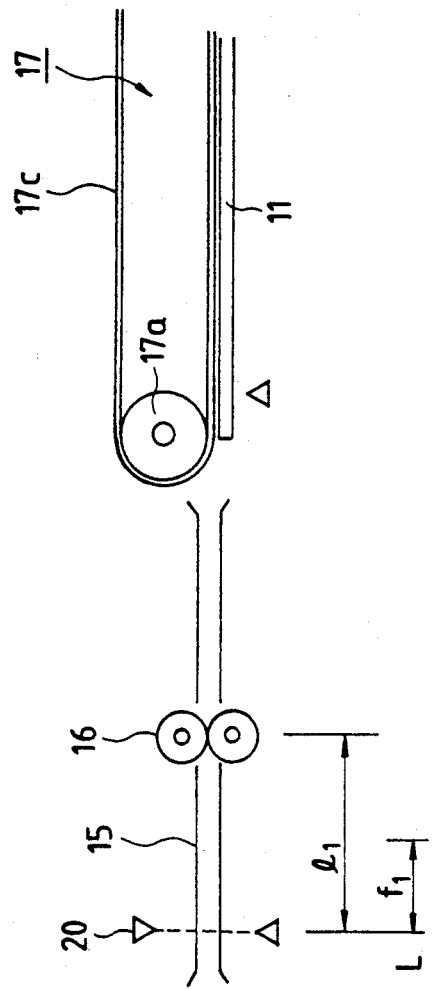
FIG. 27A is a development view showing the relationship between a sensor 20, feed rollers 16 and a whole-surface belt 17.
Figure 27B:
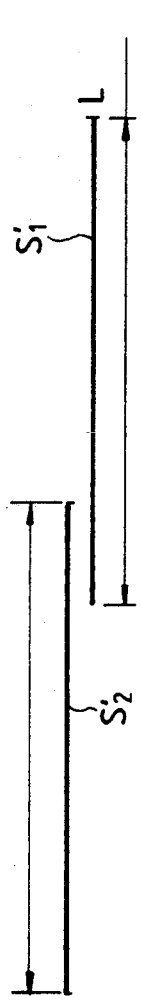
FIGS. 27B to 27D are explanatory views for explaining the feeding condition of originals.
Figure 27C:
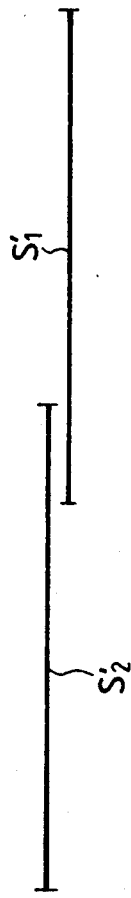
Figure 27D:
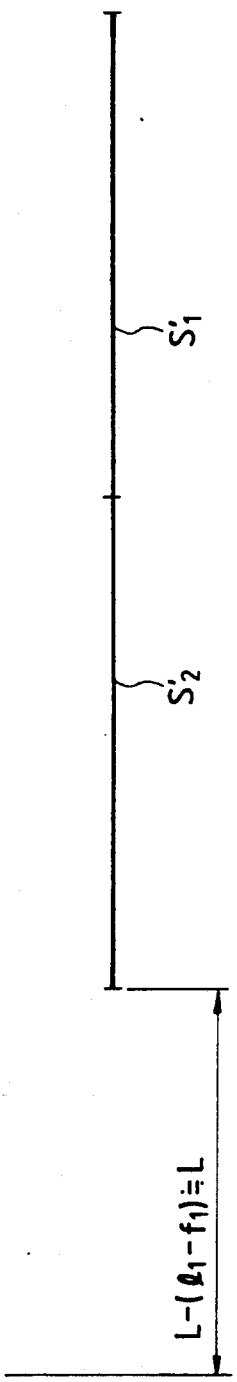

FIG. 27A is an explanatory view illustrating the positional relationship between the sensor 20, feed rollers 16 and whole-surface belt 17 in a development fashion, and FIGS. 27B to 27D are explanatory views for explaining the feeding process of the originals $S'$.

As mentioned above, the moving speed of the whole-surface belt 17 is selected to be faster than the rotating speed of the feed rollers 16 by about 3%. Further, an original pinching and feeding force provided by the nip between the feed rollers 16 (feeding force of the feed rollers 16) is selected to be stronger than an original feeding force provided between the whole-surface belt 17 and the platen 11 (feeding force of the whole-surface belt 17, so that the original $S'$ can be moved at a speed same as the rotating speed of the feed rollers 16 so long as the original is nipped between the feed rollers.

As shown in FIG. 27B, considering a condition that the trailing end of the first original $S_1'$ and of the second original $S_2'$ are overlapped with each other, when the feed rollers 16 and the whole-surface belt 17 are rotated normally in this condition, the first original $S_1'$ is moved at the speed same as the rotating speed of the feed rollers 16 until this original has been advanced by the overlapped amount and leaves the feed rollers 16, (FIG. 27C), even if the leading end of this original is engaged by the whole-surface belt 17. After the first original $S_1'$ has left the feed rollers 16, it is moved at the speed same as the moving speed of the whole-surface belt 17. In this point, since the second original $S_2'$ are still pinched by the feed rollers 16, this second original $S_2'$ is moved at the speed same as the rotating speed of the feed rollers 16. That is to say, the first original $S_1'$ is moved at the speed same as the moving speed of the whole-surface belt 17, whereas the second original $S_2'$ is moved at the speed same as the feed rollers 16, thus feeding two originals at different speeds. This condition continues until the second original $S_2'$ leaves the feed rollers 16.

A distance that the first and second originals $S_1'$ and $S_2'$ are moved during the above feeding process will have a value which is obtained by subtracting the overlapped amount $(l_1-f_1)$ from the length (L) of the original, i.e., $\{L-(l_1-f_1)\}$ (see FIG. 27D).

Incidentally, since the overlapped amount $(l_1-f_1)$ is very small in comparison with the length L of the original $S'$, the distance that the second original $S_2'$ is moved can be closely resembled to L. In this case, the first original $S_1'$ is moved longer than the advancing distance of the second original by 3%, i.e., L $\times 0.03$.

Accordingly, by selecting the overlapped amount to have a value of L $\times 0.03$, it is possible to rest the first and second originals $S_1'$ and $S_2'$ side by side on the platen 11 without no clearance therebetween.

Now, since L represents the length of the original, it should be understood that the setting value for the overlapped amount can be determined by the length of the original $S'$.

For example, in the case of the original having A4 size, the overlapped amount becomes: 210 mm $\times 0.03 = 6.3$ mm.

In the case of the original having B5 size, the overlapped amount becomes:
182 mm $\times 0.03 = 5.46$ mm.

Further, in the case of the original having LTR size, the overlapped amount becomes:
216 mm $\times 0.03 = 6.48$ mm.

Next, the relationship between the original size and the overlapped amount will be fully described.

The length L of the original is detected by counting the number of slits of the clock plate 22 by means of the photo-interrupter 23, from when the feed rollers 16 and the whole-surface belt 17 start to be driven in the step S15 to when the trailing end of the first original $S_1'$ leaves the sensor 20 in the step S16.

When the length L of the original is detected, as mentioned above, since the overlapped amount (L $\times 0.03$) can be calculated, the first original $S_1'$ may be stopped so that the trailing end of this original protrudes from the nip between the feed rollers 16 by the amount (L ×0.03). To this end, the first original may be fed by a predetermined amount $f_1$ (a distance calculated by subtracting the overlapped amount (L ×0.03) from the distance $l_1$ between the sensor 20 and the nip of the feed rollers 16) after it has left the sensor 20.

The predetermined amount can be expressed by the following equation:

$$f_1 = l_1 - (L \times 0.03).$$

Here, since $l_1$ is a constant value determined by the original feeding apparatus 12, the amount $f_1$ varies only in accordance with the size of the original S'.

For example, if the distance $l_1$ between the sensor 20 and the nip of the feed rollers 16 is 12 mm, in the case of the original having A4 size, the predetermined amount $f_1$ will be:

$$f_1 = 12 - (210 \times 0.03) = 5.7 \text{ mm}.$$

And, accordingly, the first original $S_1'$ may be fed by 5.7 mm after the trailing end of this original has left the sensor 20, and be stopped at that point.

On the other hand, in the case of the original having B5 size, the predetermined amount $f_1$ becomes:

$$f_1 = 12 - (182 \times 0.03) = 6.54 \text{ mm},$$

and in the case of the original having LTR size, the predetermined amount $f_1$ becomes:

$$f_1 = 12 - (216 \times 0.03) = 5.52 \text{ mm}.$$

By changing the amount f in accordance with the size of the original S' in the path between the sensor 20 and the feed rollers 16, it is possible to vary the overlapped amount (i.e., it is possible to vary the overlapped amount in accordance with the size of the original). As a result, it is possible to prevent the lack of the image information on the recording sheet even when the sizes of the originals are changed.

In the illustrated embodiment, while the original feeding apparatus 12 included the separate stacking tray and sheet discharge tray 25, the present invention may be adopted to an apparatus of the type wherein the original S' fed to the platen is returned to the stacking tray 13 again.

Further, an example that two originals S' are simultaneously fed to the platen 11 and the images of the originals are printed on the recording sheet was explained, three, four or more originals S' may be fed simultaneously to the platen 11 and the images of these originals may be printed on the recording sheet.

Further, while an example that the images of a plurality of originals S' are printed on the front surface of the recording medium was explained, the present invention may be applied to the both-surface printing wherein the recording medium is turned over in the copying machine and the images of a plurality of originals are also printed on the back surface of the recording medium.

What is claimed is:

1. A sheet feeding apparatus, having:
a stacking tray on which sheets are stacked;
a first sheet feeding means for supplying a sheet;
a second sheet feeding rotary means having paired opposed roller means for feeding the sheet from said first sheet feeding means toward a predetermined processing position; and
control means for rotating said opposed roller means for a predetermined time during the feeding of a first sheet, for stopping the first sheet with a trailing end thereof being retained in a nip of the opposed roller means for moving said first sheet feeding means to feed a second sheet toward the nip of said roller means and then for rotating the opposed roller means with a leading end of a second sheet being inserted into said nip to feed said first and second sheets simultaneously.

2. A sheet feeding apparatus according to claim 1, wherein said stacking tray is an original stacking tray, and a plurality of originals simultaneously fed by said second sheet feeding rotary means are rested side by side on a predetermined reading position.

3. A sheet feeding apparatus according to claim 1, wherein the trailing end of the firs sheet protrudes lightly from a nip of said paired roller means toward an upstream side in an area downstream of a wedge portion formed by outer peripheries of the opposed roller means.

4. An image forming system, having:
an original stacking tray on which originals are stacked,
first means for supplying the original;
second rotary means, having paired opposed roller means, for directing the original fed by said first feed means onto a platen;
a sheet stacking tray on which sheets are stacked;
supply means for supplying the sheet from said sheet stacking tray one by one;
image forming means for reading the original directed onto the platen and for forming an image of said original on the sheet fed by said supply means;
first control means for rotating said opposed roller means for a predetermined time during the feeding of a first sheet, for stopping the first sheet with a trailing end thereof being retained in a nip of said opposed roller means and for moving said first feed means to feed a second sheet toward the nip of said opposed roller means, and then for rotating said second rotary means with a leading end of a second sheet being inserted into said nip to feed said first and second sheets simultaneously to said platen; and
second control means for controlling said image forming means to read a plurality of originals fed to and rested side by side on said platen and to form images of said plurality of originals on a single sheet.

5. An image forming system according to claim 4, wherein the trailing end of the original protrudes slightly from the nip of said paired roller means toward an upstream side in an area downstream of a wedge portion formed by outer peripheries of said opposed roller means.

6. An image forming system according to claim 5, wherein said first control means causes the trailing end of a first original to overlap with the leading end of second original, and eliminates said overlap when the originals reach said platen.

7. An image forming system according to claim 4, wherein said second control means includes controlling means for equalizing the lacked areas of a most downstream original and of a most upstream original in reading image information of each original.

8. An image forming system according to claim 7, wherein said image forming means controlling means is a control means for said second rotary means for controlling an original stopping position with respect to said platen.

9. An image forming system according to claim 7, wherein said image forming means controlling means is a control means for an image information reading means for controlling the timing of the initiation of the image information reading means with respect to said platen.

10. An image forming system according to claim 7, wherein said image forming means controlling means is a control means for a conveying means for controlling the timing of the initiation of the feeding of the sheet.

11. An image forming system, having:
an original stacking tray on which originals are stacked;
first feed means for supplying the originals;
second rotary means for directing an original fed by said first feed means onto a platen;
a sheet stacking tray on which sheets are stacked;
supply means for supplying the sheets from said sheet stacking tray one by one;
image forming means for reading the original directed onto the platen and for forming an image of the original on a sheet fed by said supply means;
first control means for rotating said second rotary means to feed the first and second sheets simultaneously to the platen; and
second control means for controlling said image forming means to read a plurality of originals fed to and positioned side by side on said platen and to form images of the plurality of originals on a single sheet, said second control means includes control means for equalizing blank areas of a most downstream original and of a most upstream original in reading image information of each original.

12. An image forming system according to claim 11, wherein said second control means is control means for said second rotary means for controlling an original stopping position with respect to said platen.

13. An image forming system according to claim 11, wherein said second control means is control means for an image information reading means for controlling the timing of the initiation of the image information reading means with respect to said platen.

14. An image forming system according to claim 11, wherein said second control means is a control means for a conveying means for controlling the timing of the initiation of the feeding of the sheet.

15. A sheet feeding apparatus, having:
first sheet feeding means for feeding a sheet;
second sheet feeding means disposed downstream of said first sheet feeding means for further feeding the sheet;
retract means for retracting a trailing end of the sheet when the trailing end located upstream of said second sheet feeding means becomes shorter than a predetermined length by further feeding by said second sheet feeding means;
first control means for controlling so that succeeding sheet is fed to said second sheet feeding means by said first sheet feeding means when the trailing end of sheet is retracted to cause a leading end of the succeeding sheet to thereby overlap with the trailing end of preceding sheet, and thereafter the preceding sheet and succeeding sheet are fed by said second sheet feeding means;
third sheet feeding means disposed downstream of said second sheet means to feed the sheet;
second control means for controlling sheet feed speed of said third sheet feeding means faster than that of said second sheet feeding means to cancel the overlap between the preceding sheet and succeeding sheet.

16. A sheet feeding apparatus according to claim 15, wherein the sheet is an original, said third sheet feeding means is a convey belt for introducing the original to a platen glass, and the preceding original and succeeding original are positioned on the platen glass side by side by the convey belt with a small gap therebetween.

17. A sheet feeding apparatus according to claim 16, wherein the succeeding original is pushed into said second sheet feeding means while the preceding original is nipped by said second sheet feeding means and held in a stopped condition.

18. A sheet feeding apparatus according to claim 4, further having a both-face path for reversing a front face/rear face of the sheet and introducing the sheet to said image forming means again.

* * * * *

UNITED STATES PATENT AND TRADEMARK OFFICE
CERTIFICATE OF CORRECTION

PATENT NO. : 5,176,375  Page 1 of 3
DATED : January 5, 1993
INVENTOR(S) : MAKOTO KITAHARA It is certified that error appears in the above-identified patent and that said Letters Patent is hereby corrected as shown below:

COLUMN 3
    Line 29, "disappearance" should read --disappearance of--.

COLUMN 4
    Line 37, "a flow chart" should read --flow charts--.
    Line 44, "17," should read --17.--.
    Line 52, "drawings" should read --drawings.--.

COLUMN 5
    Line 1, "on" should read --one--.

COLUMN 6
    Line 11, "feed rollers" should read --feed rollers 16--.
    Line 15, "original" should read --original S'2--.
    Line 25, "further" should read --position--.
    Line 26, "position" should read --further--.

COLUMN 8
    Line 25, "rollers;" should read --roller;--.

COLUMN 9
    Line 24, "advance" should read --advanced--.

COLUMN 11
    Line 11, "the or" should read --the supplying of the second original S' has been finished or--.

UNITED STATES PATENT AND TRADEMARK OFFICE
CERTIFICATE OF CORRECTION

PATENT NO. : 5,176,375  Page 2 of 3
DATED : January 5, 1993
INVENTOR(S) : MAKOTO KITAHARA It is certified that error appears in the above-identified patent and that said Letters Patent is hereby corrected as shown below:

Line 19, "judged" should read --determined--.
    Line 22, "the" (first occurrence) should be deleted.

COLUMN 19
    Line 62, "i.e.," should read --(i.e.,--.

COLUMN 22
    Line 27, "sheet 14" should read --sheet 414--.

COLUMN 26
    Line 6, "belt 17" should read --belt 17),--.
    Line 10, "and of" should read --and the leading end of--.

COLUMN 27
    Line 36, "amount f" should read --amount $f_1$--.

COLUMN 28
    Line 19, "firs" should read --first--.
    Line 20, "lightly" should read --slightly--.
    Line 27, "first" should read --first feed--.
    Line 28, delete "second".
    Line 32, "the sheet" should read --the sheets--.
    Line 44, delete "second".
    Line 62, "second" should read --a second--.

UNITED STATES PATENT AND TRADEMARK OFFICE
CERTIFICATE OF CORRECTION

PATENT NO. : 5,176,375

DATED : January 5, 1993

INVENTOR(S) : MAKOTO KITAHARA

It is certified that error appears in the above-identified patent and that said Letters Patent is hereby corrected as shown below:

COLUMN 29
    Line 2, "image forming means controlling means" should read --second control means--.
    Line 3, "rotary" should read --feed--.
    Line 7, "image forming means controlling means" should read --second control means--.
    Line 13, "image forming means controlling means" should read --second control means--.
    Line 19, delete "second".
    Line 27, delete "second".
    Line 40, delete "second".

COLUMN 30
    Line 26, "the sheet;" should read --the sheet; and--.

Signed and Sealed this

First Day of February, 1994

BRUCE LEHMAN

Attest:

Attesting Officer     Commissioner of Patents and Trademarks